Dec. 29, 1959   L. R. BELL ET AL   2,918,772
HIGH SPEED WRAPPING MACHINE
Filed Oct. 3, 1956   18 Sheets-Sheet 1

INVENTORS
LEO R. BELL
GEORGE PANULINE
BY
George S Hastings
ATTORNEY

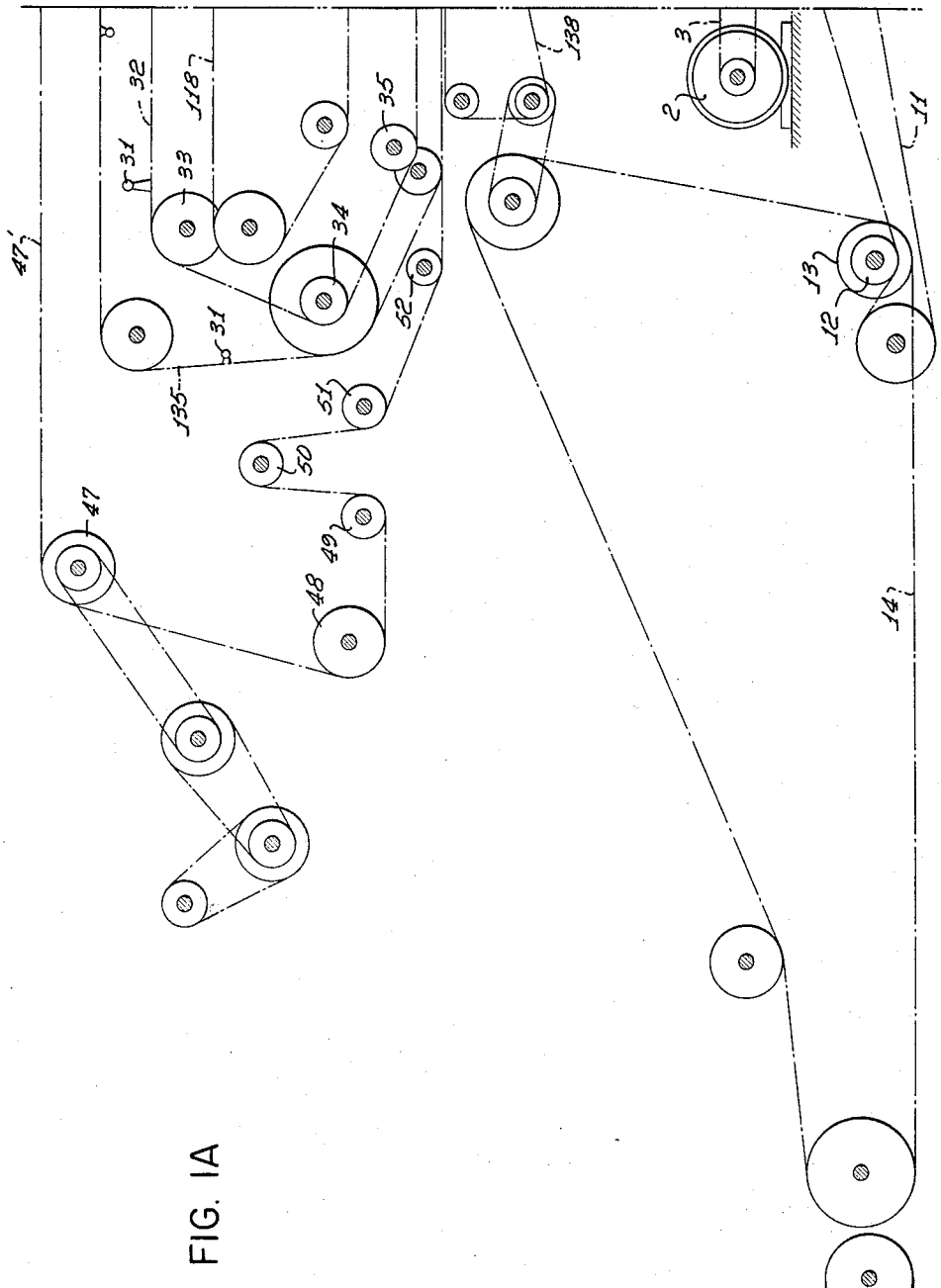
FIG. IA
INVENTOR.
LEO R. BELL
GEORGE PANULINE
BY
George S. Hastings
ATTORNEY.

Dec. 29, 1959  L. R. BELL ET AL  2,918,772
HIGH SPEED WRAPPING MACHINE
Filed Oct. 3, 1956  18 Sheets-Sheet 3

INVENTORS
LEO R. BELL
GEORGE PANULINE
BY
ATTORNEY

Dec. 29, 1959  L. R. BELL ET AL  2,918,772
HIGH SPEED WRAPPING MACHINE
Filed Oct. 3, 1956  18 Sheets-Sheet 4

INVENTOR.
LEO R. BELL
GEORGE PANULINE
BY
George S Hastings
ATTORNEY.

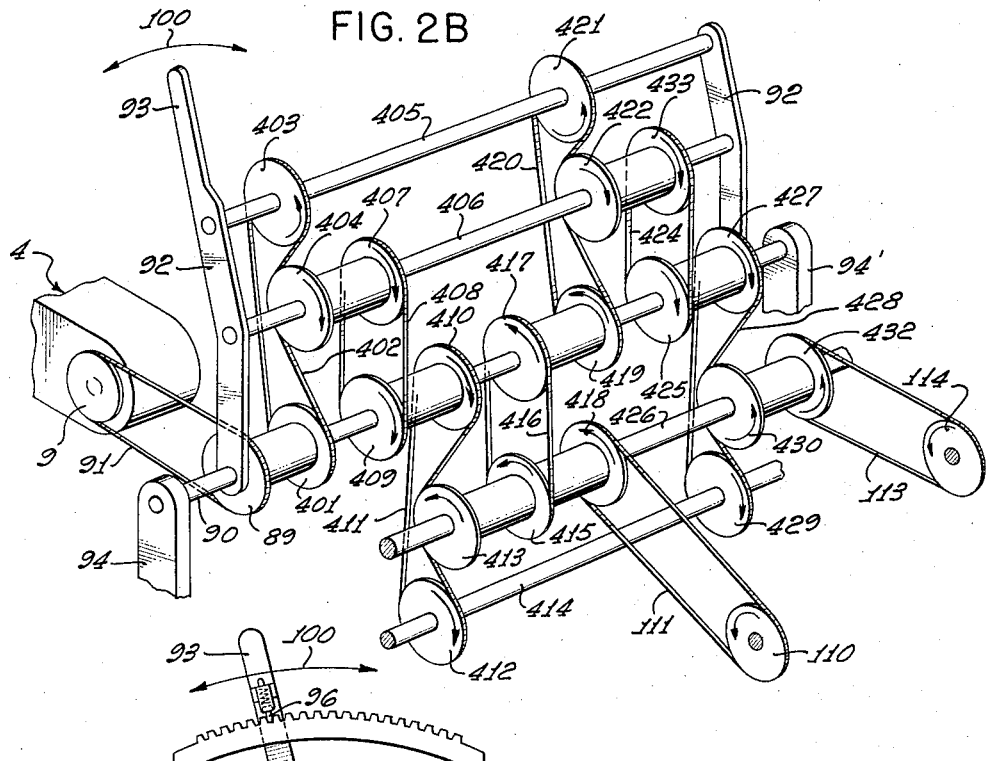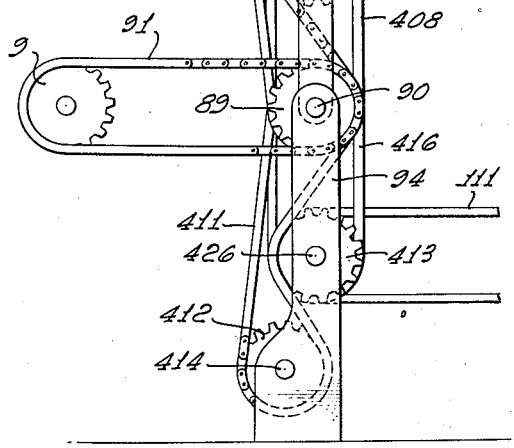

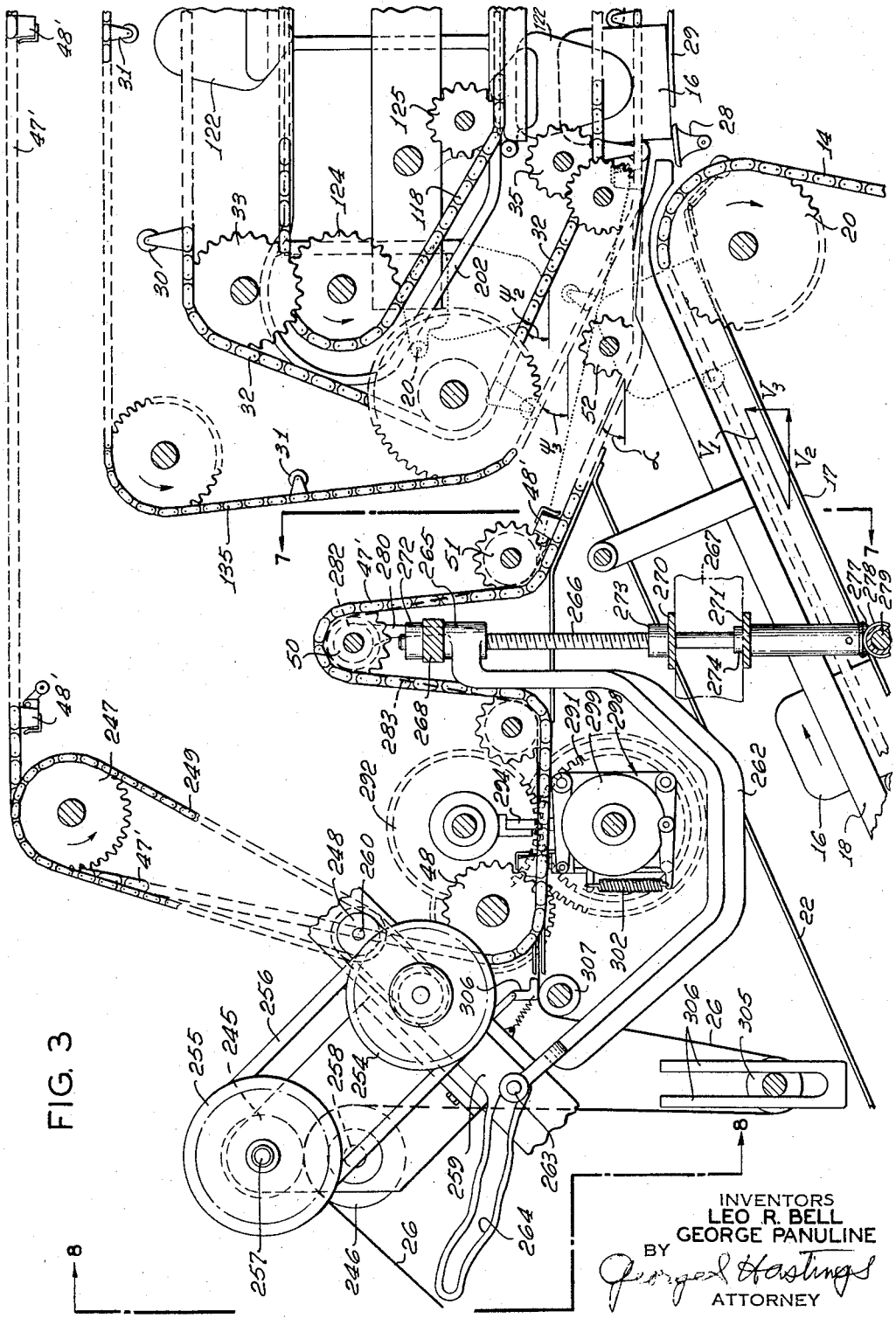

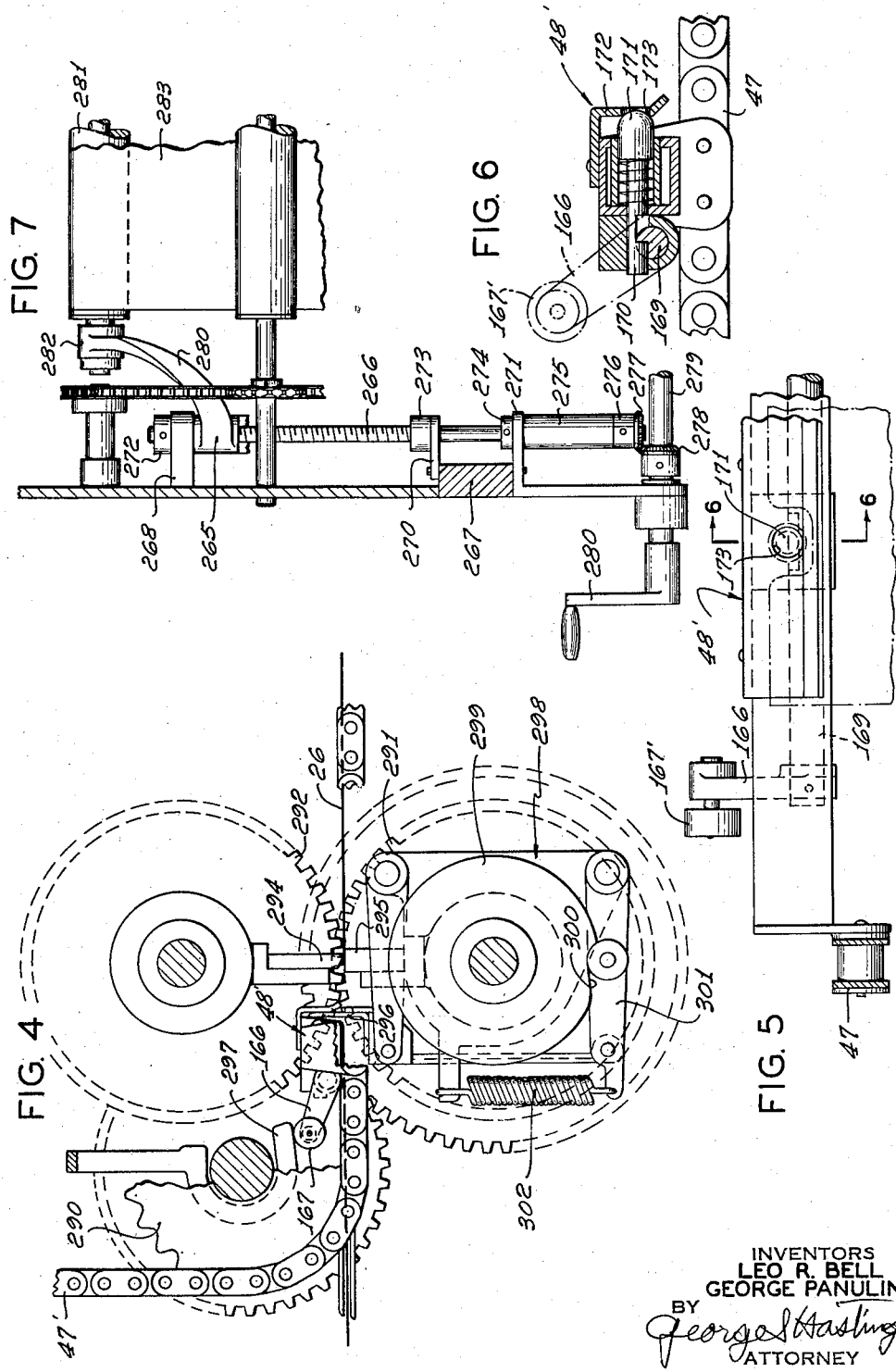

INVENTORS
LEO R. BELL
GEORGE PANULINE

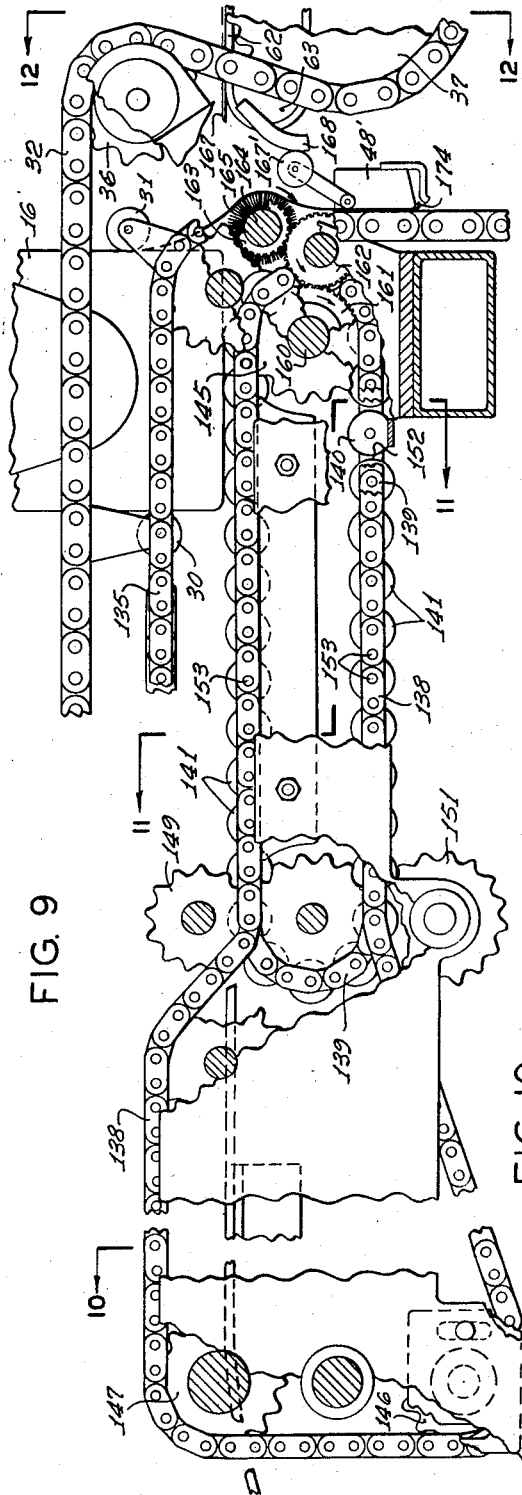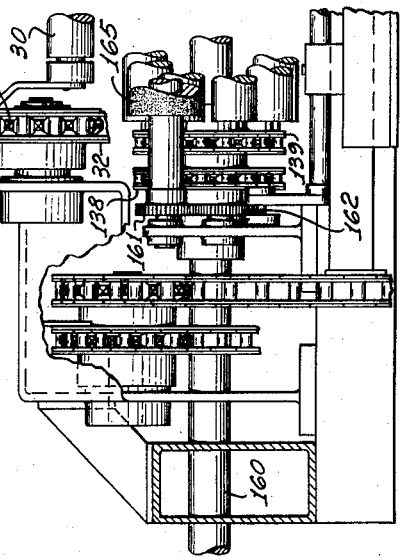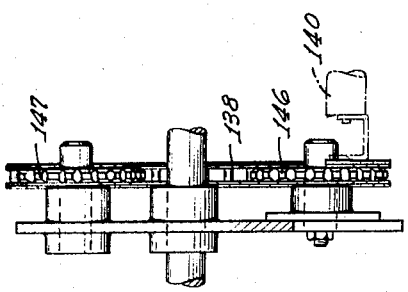
INVENTORS
LEO R. BELL
GEORGE PANULINE
BY
ATTORNEY

INVENTOR.
LEO R. BELL
GEORGE PANULINE
BY
*George S Hastings*
ATTORNEY.

Dec. 29, 1959 L. R. BELL ET AL 2,918,772
HIGH SPEED WRAPPING MACHINE
Filed Oct. 3, 1956 18 Sheets-Sheet 11
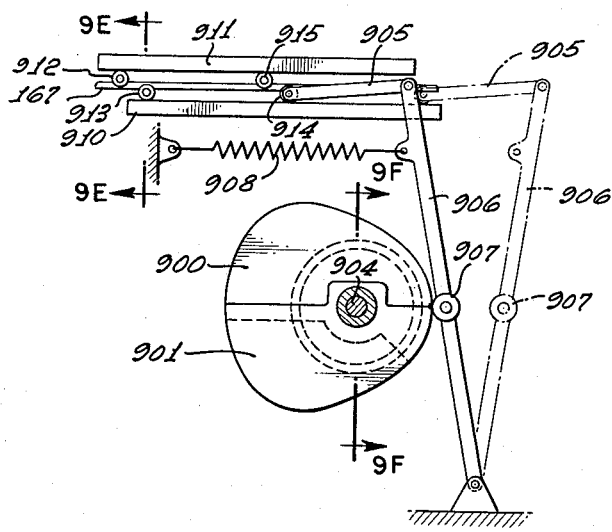
FIG. 9D
FIG. 9E
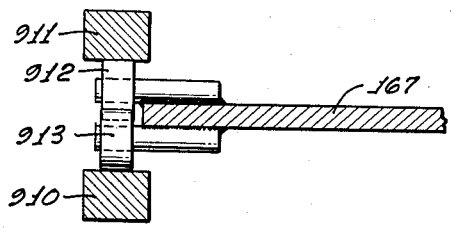
FIG. 9F
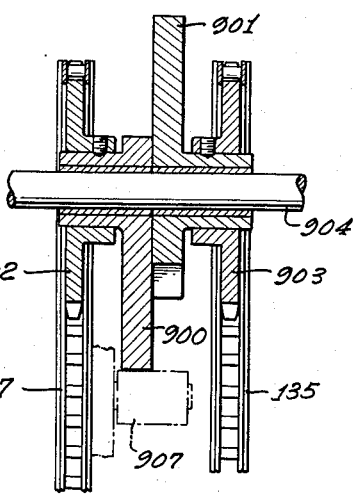
FIG. 9G
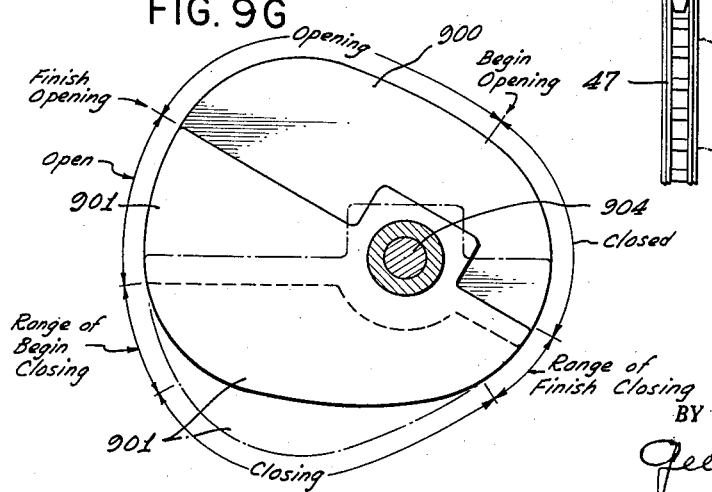
INVENTOR.
LEO R. BELL
GEORGE PANULINE
BY
George S Hastings
ATTORNEY.

Dec. 29, 1959    L. R. BELL ET AL    2,918,772
HIGH SPEED WRAPPING MACHINE
Filed Oct. 3, 1956    18 Sheets-Sheet 12

INVENTORS
LEO R. BELL
GEORGE PANULINE
BY George Hastings
ATTORNEY

Dec. 29, 1959     L. R. BELL ET AL     2,918,772
HIGH SPEED WRAPPING MACHINE
Filed Oct. 3, 1956     18 Sheets-Sheet 13
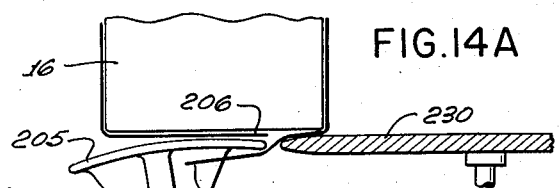
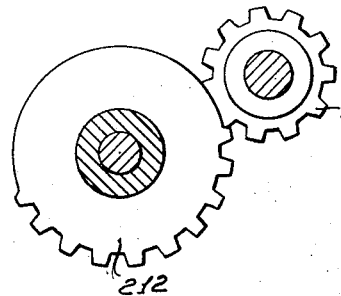
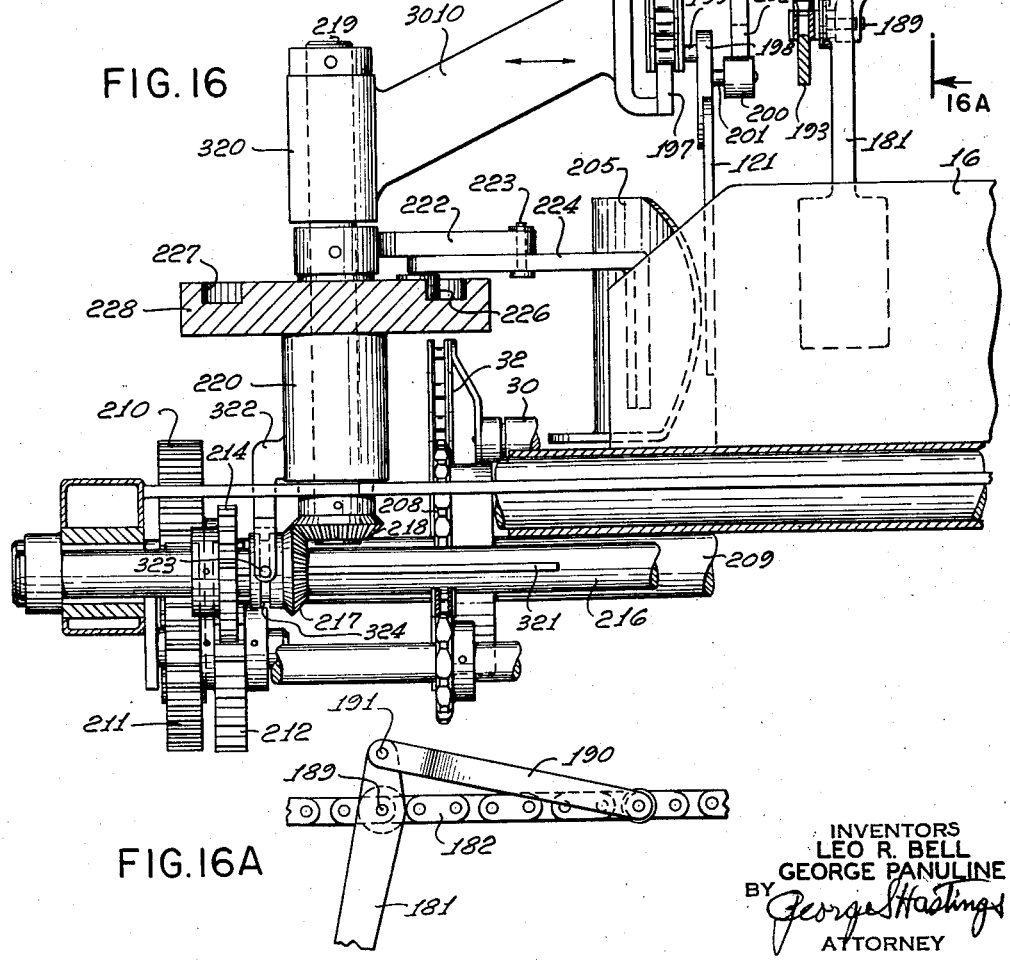
INVENTORS
LEO R. BELL
GEORGE PANULINE
BY George Hastings
ATTORNEY Dec. 29, 1959   L. R. BELL ET AL   2,918,772
HIGH SPEED WRAPPING MACHINE
Filed Oct. 3, 1956   18 Sheets-Sheet 14

INVENTORS
LEO R. BELL
GEORGE PANULINE
BY
George S Hastings
ATTORNEY

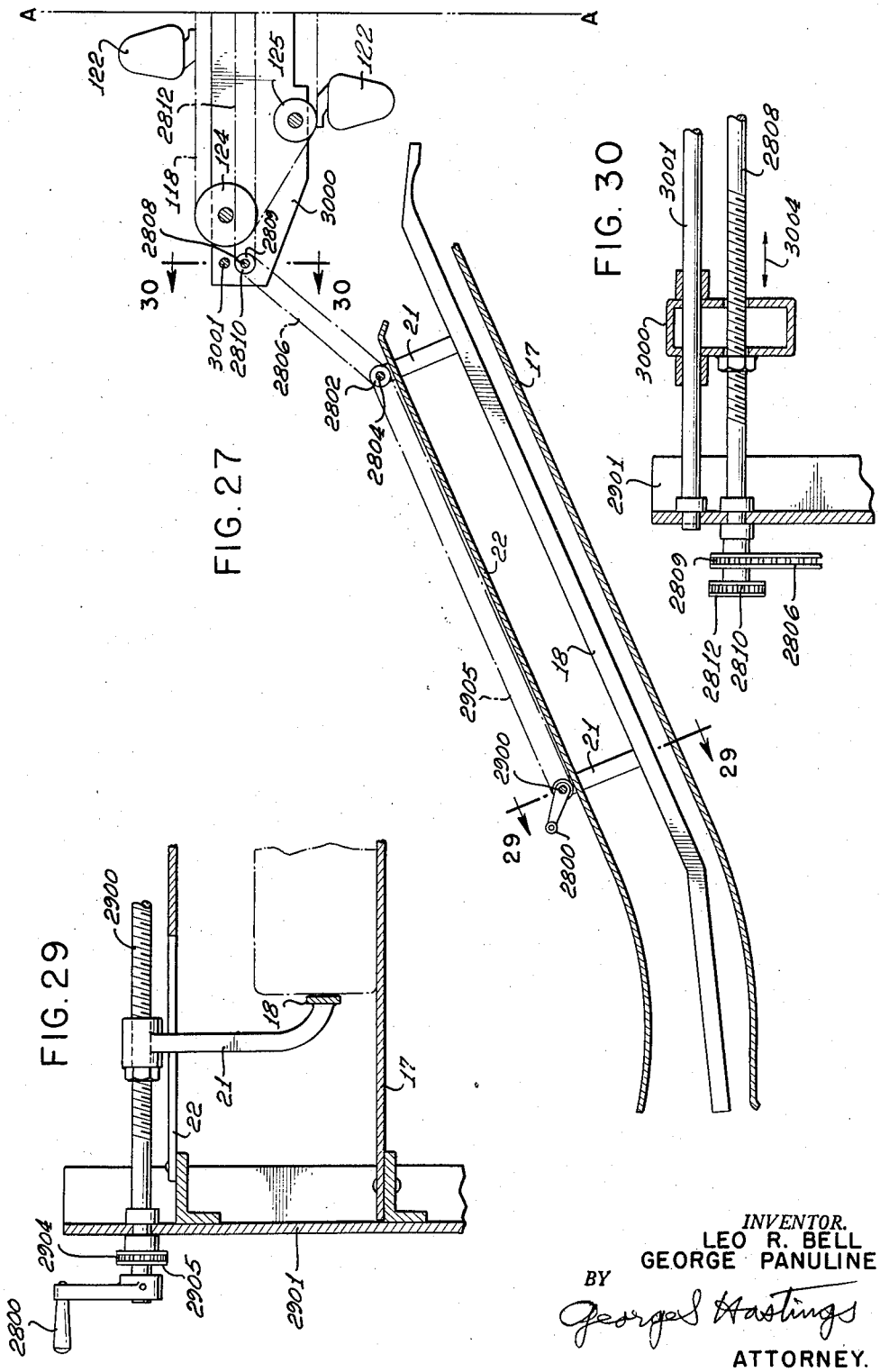

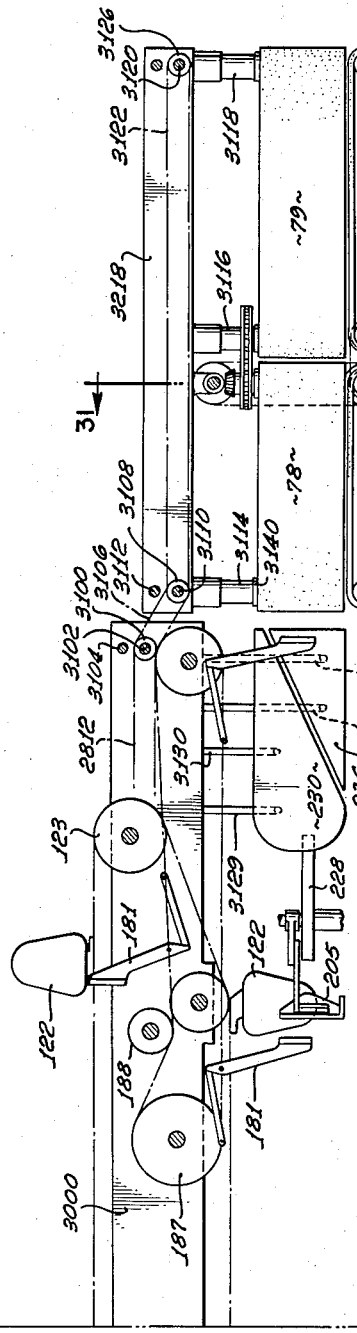
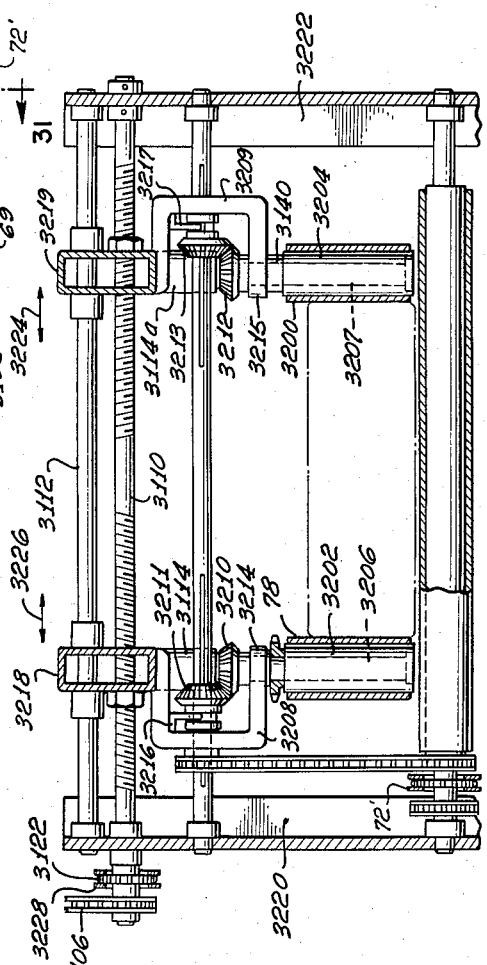

Dec. 29, 1959   L. R. BELL ET AL   2,918,772
HIGH SPEED WRAPPING MACHINE
Filed Oct. 3, 1956   18 Sheets-Sheet 18

INVENTOR.
LEO R. BELL
GEORGE PANULINE
BY
ATTORNEY.

United States Patent Office 2,918,772
Patented Dec. 29, 1959

2,918,772

HIGH SPEED WRAPPING MACHINE

Leo R. Bell, Encino, Calif., and George Panuline, Fresh Meadows, N.Y., assignors to American Machine & Foundry Company, a corporation of New Jersey Application October 3, 1956, Serial No. 613,678

47 Claims. (Cl. 53—228)

This invention relates to wrapping machines and more particularly to continuous, straight line flow wrapping machines in which all mechanisms are actuated by means of a continuous, rotary action, whereby high speed operation of the machine is obtained.

The invention relates to machines for automatically wrapping and sealing articles such as loaves of bread, other bakery articles, and other products of manufacture, such as cases, or individual cakes of soap, boxes containing cereals, and any other articles having or approaching the shape or the outline of a rectangular parallelepiped. The machine is provided with means for automatically forming moisture tight packages by enclosing the articles in a thermosetting web and sealing the folds of the web by first heating the folds and then immediately refrigerating the folds. One version of the machine is arranged so that the article moves at a constant speed from end-to-end of the machine.

It is an object of this invention to provide a continuous, single plane flow wrapping machine in which all mechanisms are actuated by means of continuous, rotary action mechanisms, including a continuous web feed mechanism, in which the web is precut and then wrapped around the article while the article is moving at said constant speed.

It is also an object of this invention to provide a wrapping machine which produces less crushing of the articles being wrapped because of straight line, constant speed and direction of travel of the articles, and in which high speed of operation is obtainable because of the elimination of reciprocating motions and variable speeds of travel of the mechanisms and of the articles to be wrapped.

It is an additional object of this invention to provide an article wrapping machine in which an araticle to be wrapped is moved at a constant speed, which reduces, or eliminates, wear and tear on the articles being wrapped, distortion of packages, and allows more time for each individual operation, although the overall rate of operation is faster than of the known wrapping machines using reciprocating or discontinuous motions.

Still another object of this invention is to provide a continuous, one direction flow wrapping machine which is capable of producing soft, or loosely wrapped, packages which are obtainable by eliminating friction encountered by the package in the machines where the package is started from rest, where the bottom of the package is caused to slide along stationary surfaces, and where unduly tight wrapping is also encountered because of change in the direction of travel of the package.

It is another object of this invention to provide an article wrapping machine having simpler and more reliable mechanisms so as to produce an overall machine having greater operating stability, simplicity, reliability, free of interruptions and breakdowns so as to avoid any necessity for having reserve wrapping machines on hand to use in case of any breakdowns of the machines which are in use.

Still another object of this invention is to provide an article wrapping machine capable of producing attractive, uniformly and neatly wrapped articles at higher rate of wrapping than what can be attained with the known machines.

It is also an additional object of this invention to provide a wrapping machine in which the wrapping material, or the web, is carried through a cut-off mechanism and cutting, gripping and feeding of the web are performed simultaneously while the web is being pulled and cut at the same time, the cutting being performed by continuously and uniformly rotatable knife and platen.

It is an additional object of this invention to provide an article wrapping machine operated from a single power shaft by means of a plurality of continuous chains, or other positive drive means, such as which operate an infeed slide, a web feeding, gripping and cut-off mechanism, an article feeding and web folding and wrapping mechanisms, means for driving endless belts are also provided for carrying the wrapped articles through the sealing belts and then through the refrigerating belts.

An additional object of this invention is to provide novel web-tucking, folding and wrapping means in the machine of the above type.

It is also an object of this invention to provide a mechanical phase shifter for adjusting the phase of positive driven means to the phase of the positive driving means.

It is also an object of this invention to provide means for adjusting the entire machine for package length from a single point of operation.

An additional object of this invention is to provide means for simultaneous adjustment of some of the wrapping and article-feeding mechanisms for package, or article, width with a single adjustment means.

The novel features which are believed to be characteristic of the invention, both as to its organization and method of operation, together with the further object and advantages thereof, will be better understood from the following description taken in connection with the accompanying drawings in which the single embodiment of the invention is illustrated here as an example of the invention. It is to be expressly understood, however, that the drawings are for the purpose of illustration and description only and are not intended as a definition of the elements of the invention. Referring to the drawings:

Figures 1A and 2A are side views of the machine illustrating how the machine is driven from a shaft of a single motor;

Figure 2B is a perspective diagrammatic view of a mechanical phase shifter used for driving some of the chains of the machine;

Figure 2C is a side elevation of the phase shifter;

Figure 3 is an enlarged side-view of the web feeding and cutting mechanism; the figure, at its right side, also illustrates a portion of the web-wrapping and article-advancing mechanism;

Figure 4 illustrates, more in detail, the vertical side-view of the web-cutting mechanism;

Figure 5 is an enlarged, vertical transverse view of the web-gripping mechanism, the vertical side view of which is also illustrated in Figure 4; the views in Figures 4 and 5 are at right angles to each other, the plane of the view in Figure 5 being at right angles to the plane of the drawing;

Figure 8:
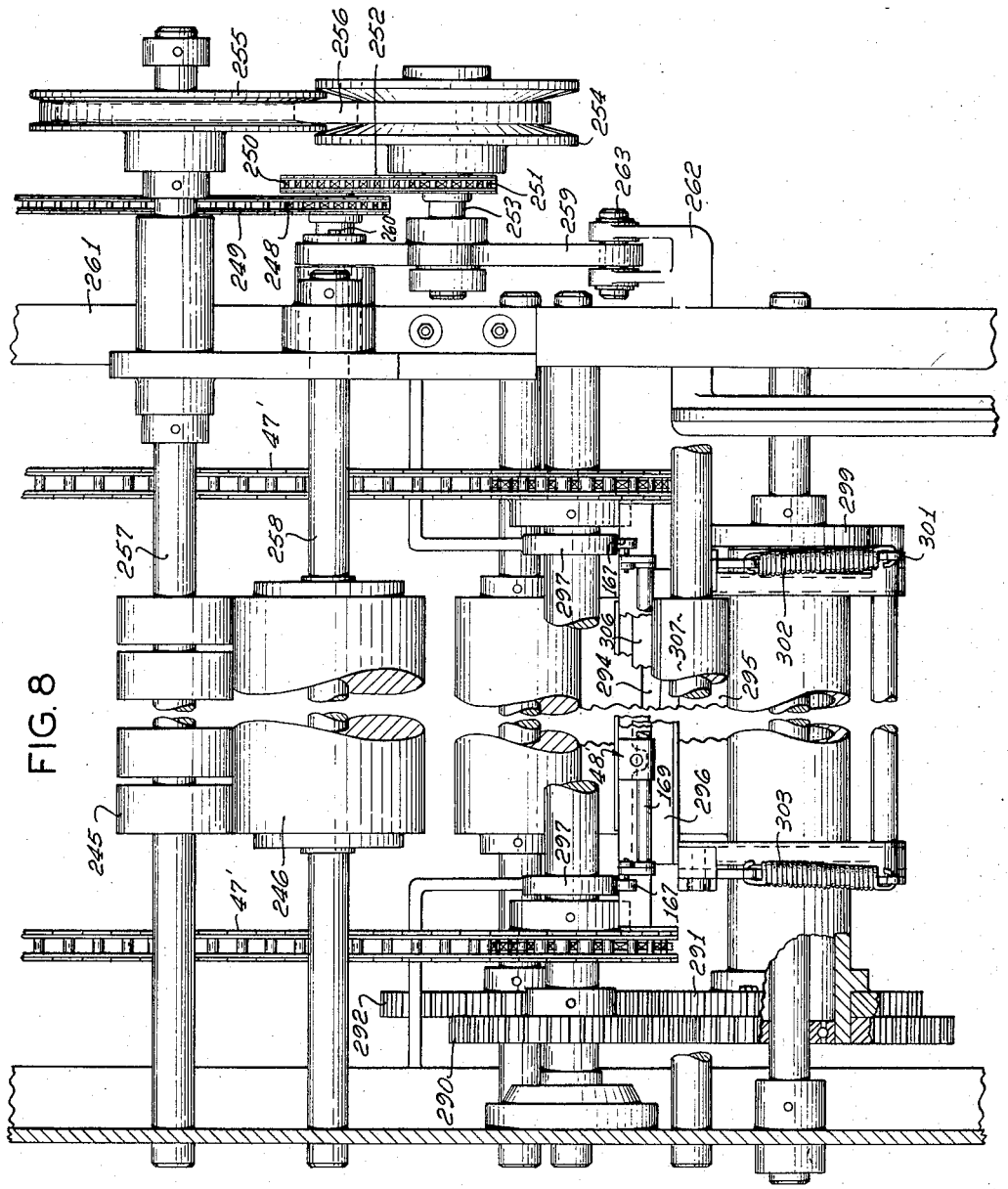
Figure 9A:
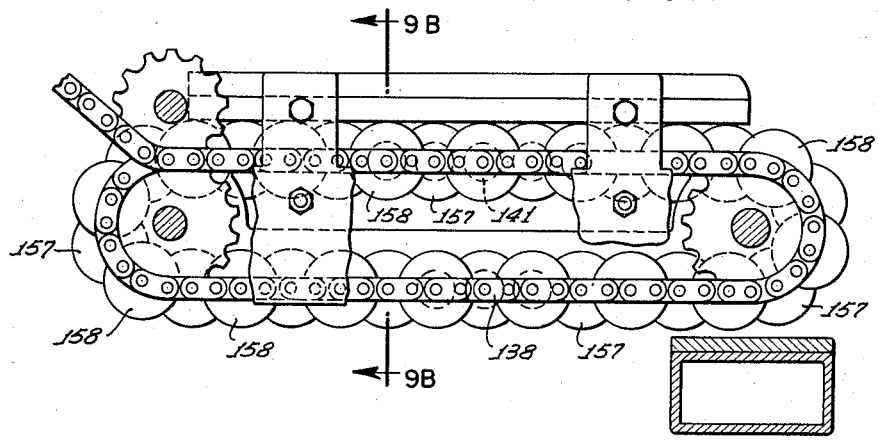
Figure 9B:
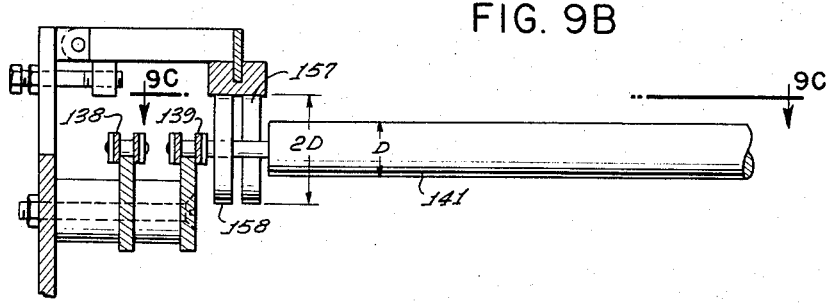
Figure 9C:
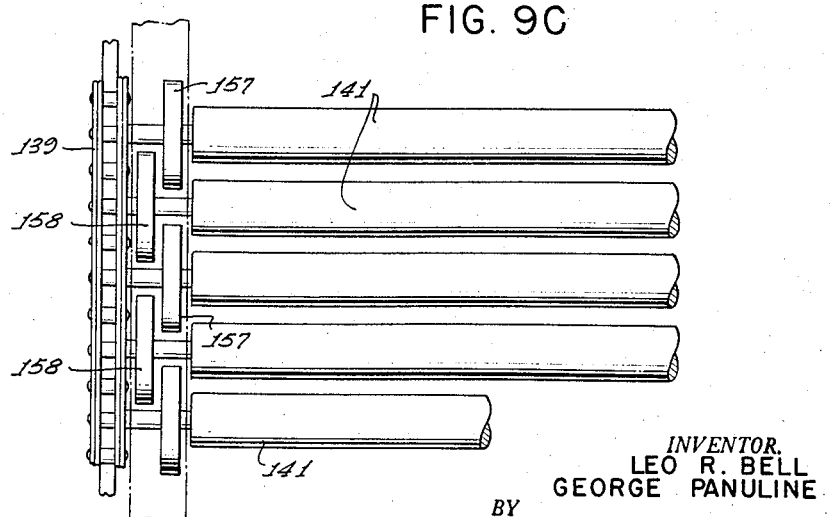
Figure 13:
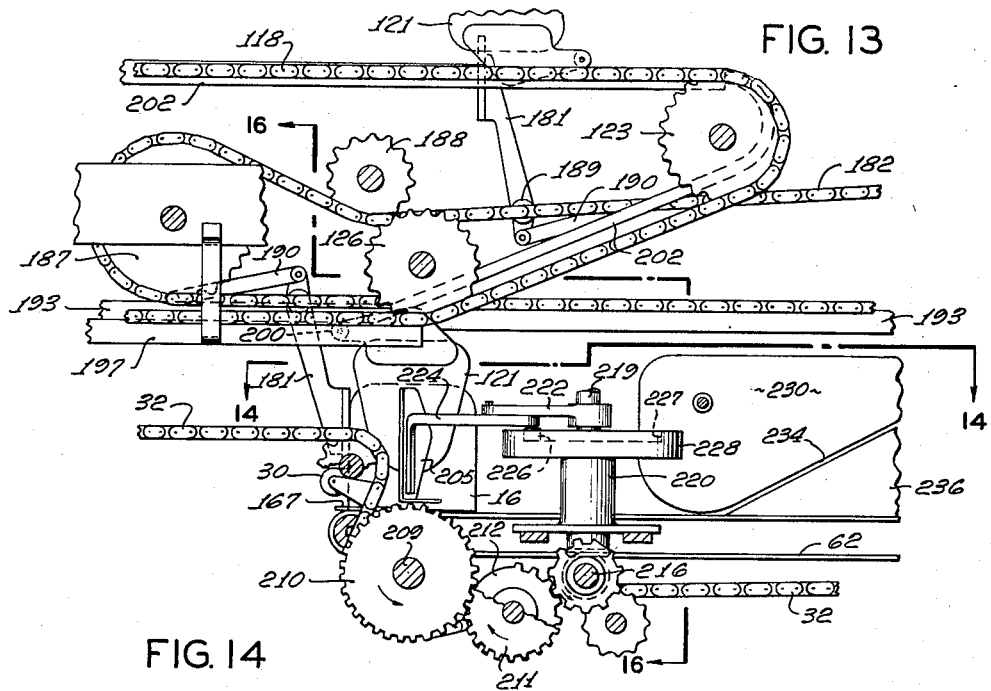
Figure 14:
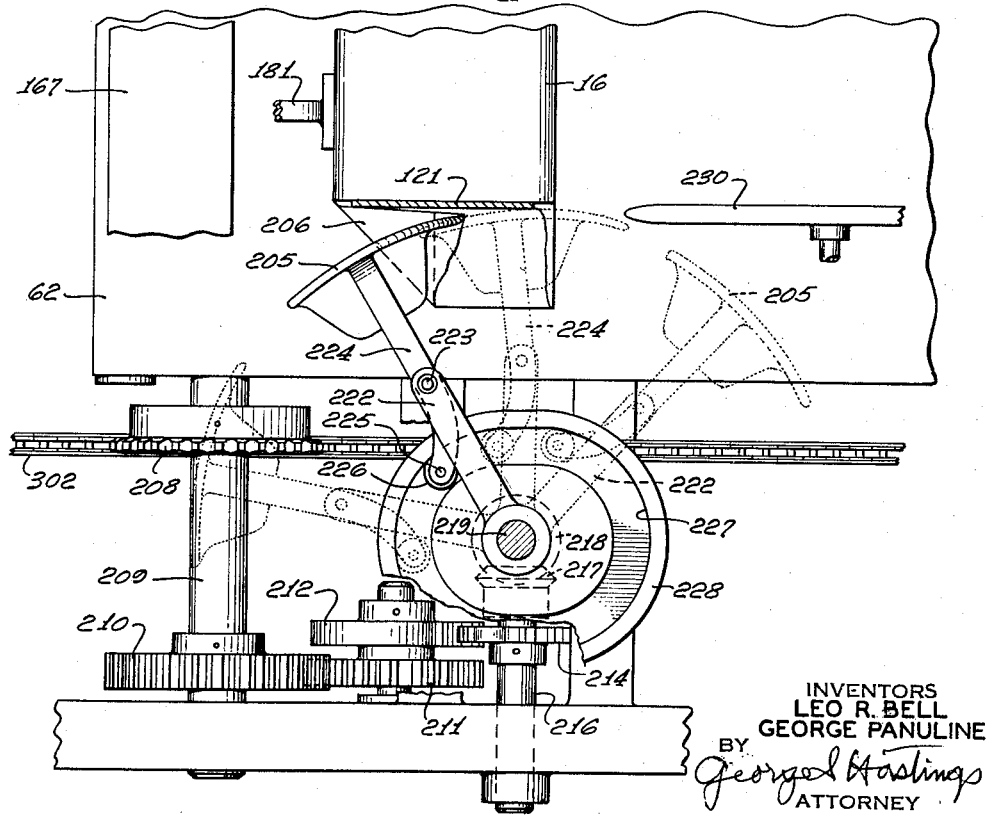
Figure 17:
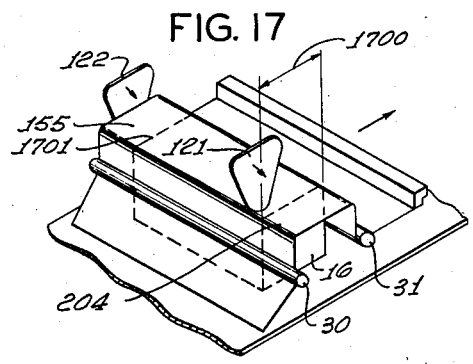
Figure 18:
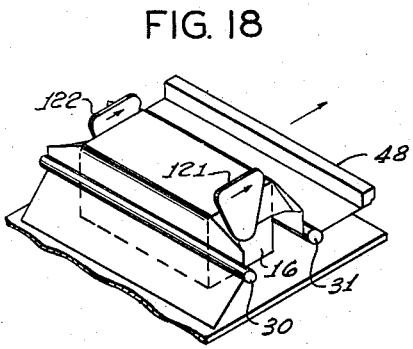
Figure 32:
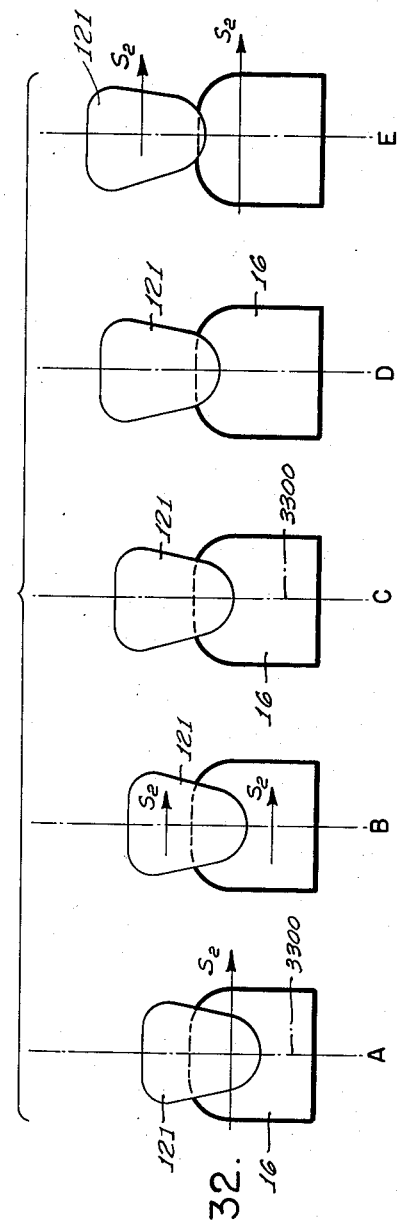
Figure 33:
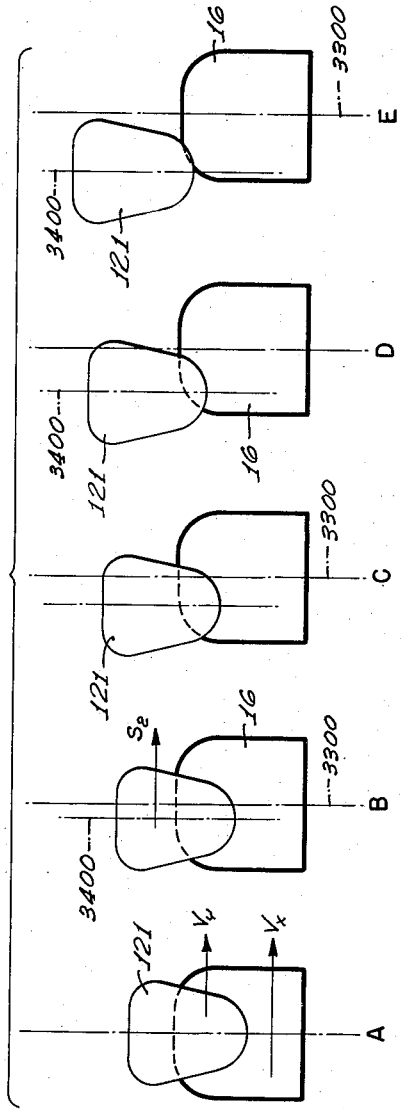

Figure 6 is a vertical view, partly in section, of the web-gripping mechanism taken along line 6—6 illustrated in Figure 5;

Figure 7 is a vertical, transverse partial view, partly in section, of the mechanism for adjusting the vertical position of the idler roller, this vertical position determining the length of the web cut-off by the web-cutter, the transverse plane of this view being illustrated by line 7—7 in Figure 3;

Figure 8 is a vertical transverse view, taken in a plane 8—8, Figure 3, of the web-feeding and cutting mechanism;

Figure 9 is a side-view of the forward bottom folder mechanism and of the gap-closing region;

Figure 9A is a side view of a modified version of the forward bottom folder mechanism the first version of which is illustrated in Figure 9;

Figure 9B is a transverse vertical section view of one end of the bottom folder mechanism illustrated in Figure 9A taken along line 9B illustrated in Figure 9A;

Figure 9C is a top view of the rollers illustrated in Figure 9B the view being taken along line 9C illustrated in the above figure;

Figure 9D illustrates side views of a cam mechanism for driving a gap-closing reciprocating plate;

Figure 9E is a vertical transverse sectional view of a portion of the plate, guide rollers and 2 rails used for guiding the gap-closing reciprocating plate, the view being taken along line 9E—9E illustrated in Figure 9D;

Figure 9F is a vertical transverse section of the driving mechanism for a cam used for reciprocating the gap-closing plate, the view being taken along line 9F—9F illustrated in the Figure 9D;

Figure 9G is a side view of the cam used for reciprocating the gap-closing plate;

Figures 10, 11 and 12 are the transverse views of the portions of the forward bottom folder mechanism taken along lines 10, 11 and 12 shown in Figure 9;

Figure 13 is a side view of the second folder mechanism and top transfer mechanism;

Figure 14 is a plan view of the second folder mechanism; taken along line 14—14 shown in Figure 13;

Figure 14A is an enlarged plan view of the second folder mechanism in the dwell position;

Figure 15 is a side view of two intermittent drive gears used for driving the second folder mechanism;

Figure 16 is a transverse vertical view, taken along line 16—16, Figure 13, of the second folder mechanism;

Figure 16A is a vertical side view of a pusher arm, taken along line 16A—16A of Figure 16, and connections between the arm and the chain used for operating the pusher arm;

Figures 17 through 26 illustrate the article being wrapped in the successive wrapping and end-folding stages as it proceeds through the wrapping machine;

Figures 27 and 28 are vertical side views, partly in section, of the wrapping machine, and more particularly of the lateral adjustment mechanism of the machine; these two figures should be matched along line A—A for proper reading of these figures;

Figure 29 is a sectional view of Figure 27 taken along line 29—29;

Figure 30 is a vertical sectional view of Figure 27 taken along line 30—30;

Figure 31 is a vertical sectional view of Figure 28 taken along line 31—31;

Figures 32 and 33 are explanatory figures illustrating two possible modes of operation of the top folder mechanism.

Referring to Figures 1, 2, 1A and 2A, the wrapping machine will be described and illustrated as a bread-loaf wrapping machine. It is to be understood, however, that the machine is suitable for wrapping any other articles, as it has been mentioned in the introductory part of the specification.

Figure 1:
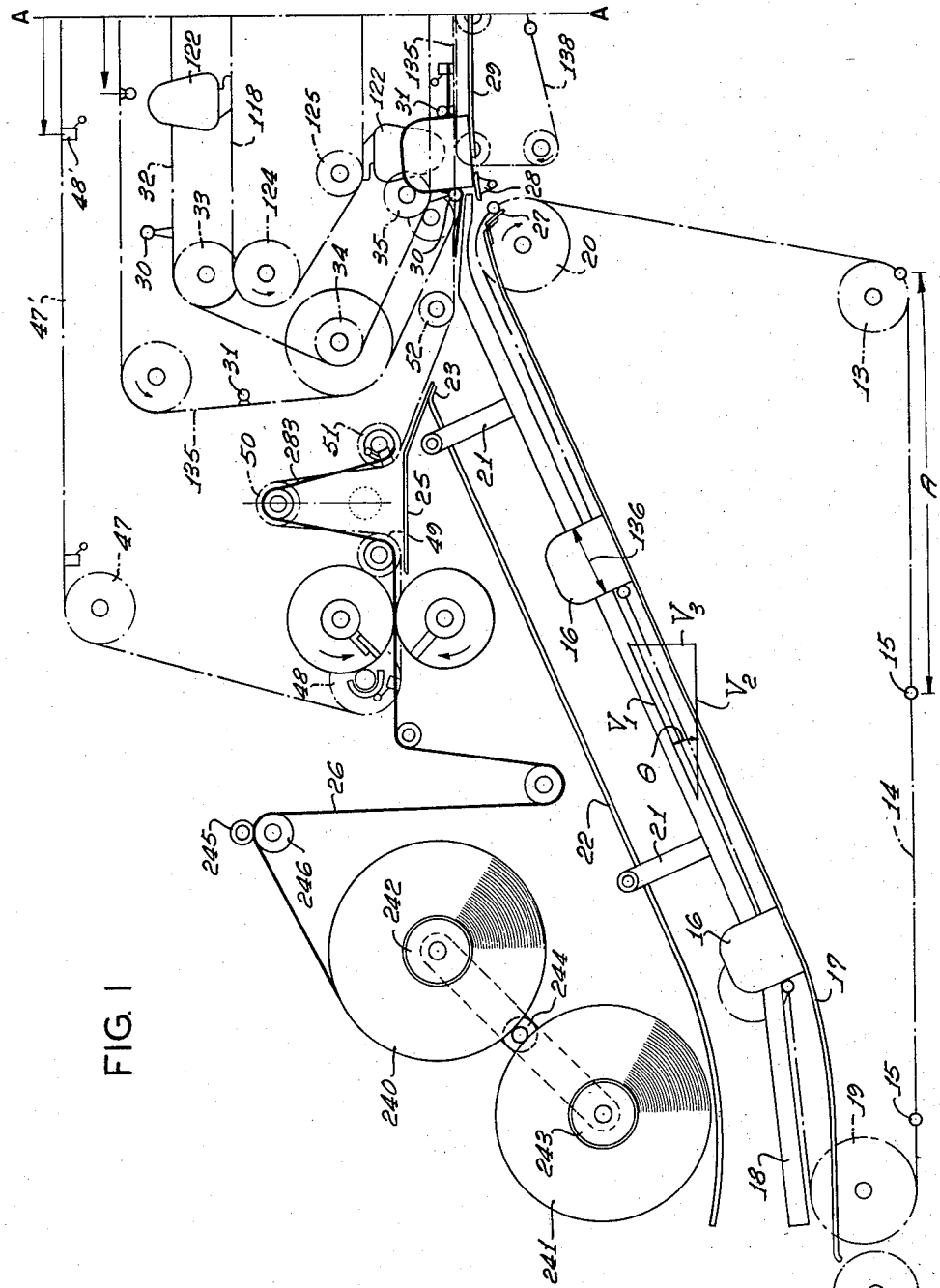
Figures 1 and 2 are vertical, sectional side views of the wrapping machine, the two figures forming one continuous sectional side-view of the machine after they are matched along the dotted line A—A; the section being taken substantially along the longitudinal, central axis of the machine.
Figure 2:
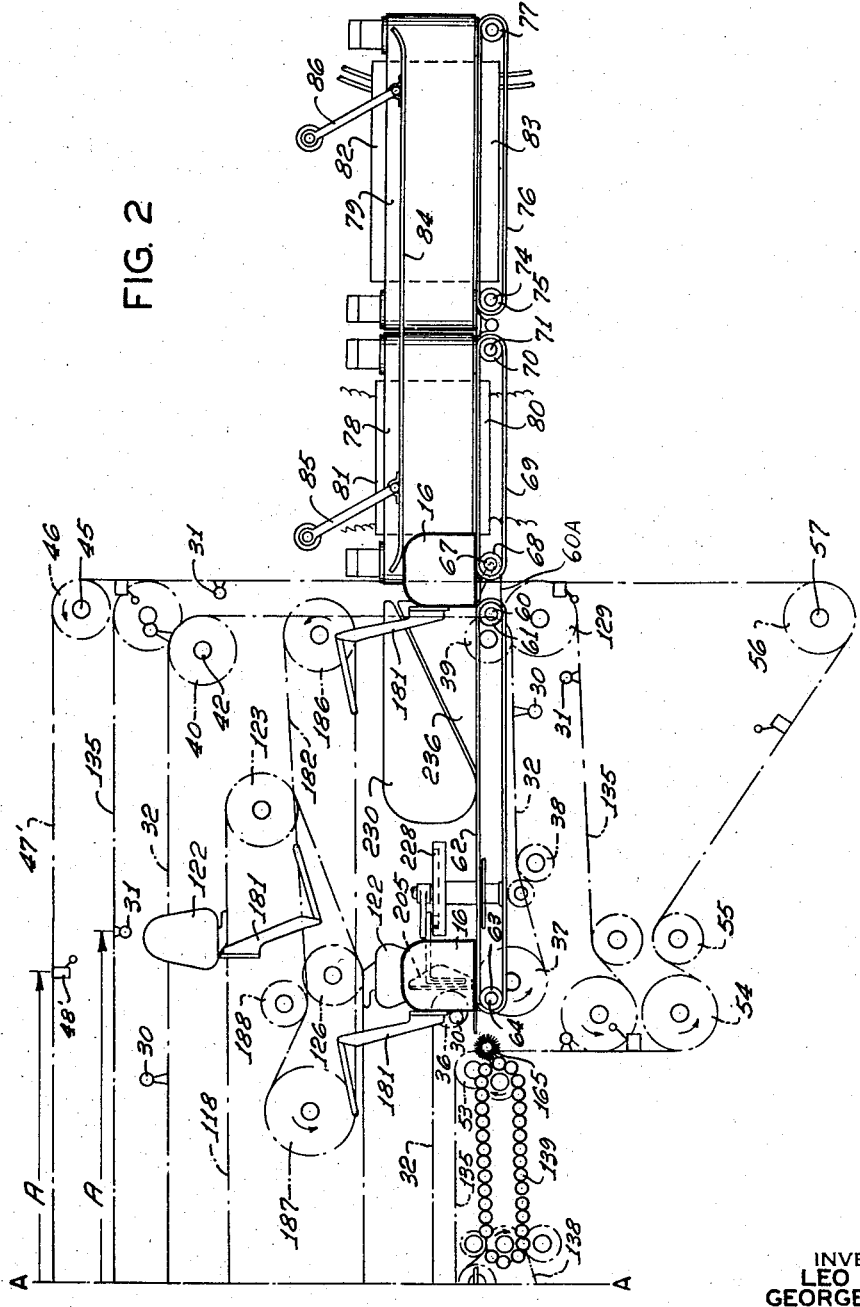

The machine is driven by an electric motor 2, Figure 1A, which is connected through an endless chain 3 to a variable speed drive 4 provided with a crank 5 and a shaft 6 for adjusting the speed of rotation of three sprocket wheels 7, 8 and 9 mounted on a shaft 10 the angular speed of which can be varied by means of the variable speed drive 4. Drives of this type are known in the art and need no detailed description. An example of such a drive is the Reeves variable speed drive made by the Reeves Manufacturing Company. Sprocket wheel 7 is connected through a chain 11 to a sprocket wheel 12 which, through a sprocket wheel 13, drives an infeed pusher bar chain 14 having a plurality of infeed pusher bars 15 extending across and above the bottom infeed slide 17. Bars 15 are used for engaging the articles to be wrapped, such as loaves of bread 16, at the bottom of the infeed slide 17 provided with two infeed side guides 18. The vertical section of the wrapping machine illustrated in Figures 1 and 2 is taken along the longitudinal center axis or line, and, therefore, only one side guide 18 is visible in this figure. This is also true of the other elements illustrated in Figures 1 and 2. Four sprocket wheels, such as 19 and 20, are used for supporting chain 14 and the pusher bars 15 fastened to chain 14. The bottom infeed chute 17 is supported by a frame member 2901, Figure 29, which also supports a cover 22 which protects the articles 16 from being exposed to dust and any other extraneous matter dropping from a web material 26 and that part of the machine which is mounted directly above the infeed slide, or chute. Brackets 21 support side guides 18 in the manner illustrated in Figure 29, from a threaded member 2900.

The inner end 23 of the cover element 22 is also used for supporting a curved tray 25 which is used as a paper guide or shield.

The upper end of the infeed chute 17 is provided with a pivoted, spring-loaded infeed gate 27 which permits the passage of the pusher bars 15 between the upper end of the infeed slide 17 and a stationary infeed bridge 28 after article 16 passes over gate 27. The spring (not illustrated) normally holds gate 27 in the closed position, so that it normally closes the gap between chute 17 and bridge 28 for providing a continuous, smooth path of travel for the articles 16.

After passing over the infeed chute 17, article 16 is pushed over to the infeed bridge 28 and an intermediate bridge 29 at which point of its continuous travel article 16 is picked up by a rear pusher bar 30 and a forward retainer bar 31. The rear pusher bar 30 is mounted on two endless chains, such as chain 32, which revolve around the sprocket wheels 33 through 40. Sprocket wheel 40 is driven by a sprocket wheel 41, mounted on a shaft 42, through a chain 43 which is wrapped around a sprocket wheel 44 mounted on a shaft 45. Wheel 44 is driven by sprocket wheel 46. Wheel 46 engages and is driven by an endless chain 47' which is provided with a web clamping device, or web clamp 48'. The web clamp 48' is illustrated more in detail in Figures 4 through 6 which will be described later in this specification. The chain carrying the web clamp 48' revolves around the sprocket wheels 46 through 56. Sprocket wheel 56 is mounted on a shaft 57 which has a sprocket wheel 58 keyed to the same shaft. Sprocket wheel 58 is used for driving a sprocket wheel 59 mounted on a shaft 60 which also has a roller 61 keyed to this shaft. Roller 61 is used for driving a belt 62 which is used for supporting the bottom of article 16 in the manner illustrated in Figures 2 and 2A. The endless belt 62 is also wrapped around a roller 63 mounted on a shaft 64. An additional sprocket wheel 65 is mounted on shaft 60 which is used for driving a sprocket wheel 66, a shaft 67, a roller 68 and a metallic bottom sealer belt 69 wrapped around rollers 68 and 70. Roller 70 is mounted on and drives a shaft 71 which has a sprocket wheel 72 for driving a sprocket wheel 73 by means of chain 72. Wheel 73, in turn, drives a shaft 74, a roller 75 and a metallic bottom polar seal belt 76 wrapped around the rollers 75 and 77. The machine is also provided with two metallic side sealer belts, such as belt 78, and two side sealer belts, such as belt 79, which are revolved around their respective rollers in the manner illustrated in Figures 2 and 2A. Belts 69 and 78 are provided with the electric heater elements 80 and 81 which heat the metallic belts and melt a sealing wax or other thermosetting substance used on the web or constituting the web which is later cooled by the belts 76 and 79 with the aid of refrigerating elements 82 and 83. The lateral positions of the side belts 78 and 79 and the two side-belts not visible in Figure 2, are made adjustable with respect to the center line of the machine as will be described later in this specification. The lateral adjustment of the side sealer belts 78 and 79 is provided for adjusting the transverse distance between the belts so as to make it equal to the transverse dimension of the article being wrapped at any given time. The sealing mechanism is provided with a top hold down element 84 which is supported by means of two hinged arms 85 and 86. The side sealer belts are driven from any one of the horizontal shafts, such as shaft 60 by means of a chain 60A, Figures 2 and 2A.

Figure 2A:
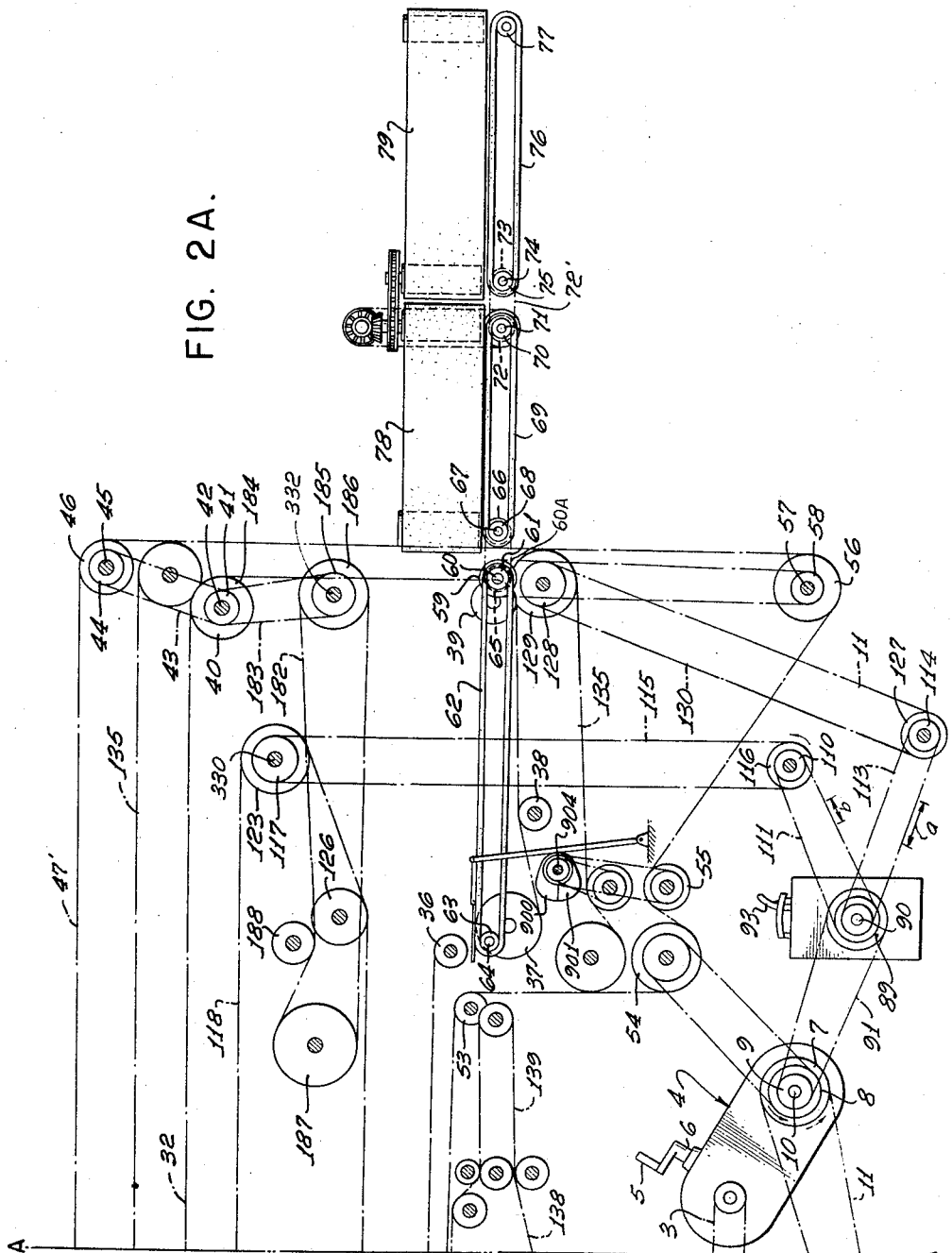

Reverting to the variable speed drive 4 and a sprocket wheel 9, wheel 9 is connected to a sprocket wheel 89, Figure 2A, 2B and 2C, mounted on an axle 90, through a chain 91. Sprocket wheel 89 drives sprocket wheels 432 and 418, Figure 2B, which in turn, drive sprocket wheels 114 and 110, respectively. Wheel 114 is rigidly connected to wheel 127 and wheel 110 is rigidly connected to wheel 116.

Therefore sprocket wheel 114 drives sprocket wheels 127, 128 and 129 through a sprocket wheel 127 and a chain 130, chain 130 driving a forward retainer bar chain 135 which has a plurality of forward retainer bars 31 mounted on this chain. Sprocket wheel 110 drives a sprocket wheel 116, a chain 115, sprocket wheels 117, 123, 124, idlers 125, 126, a chain 118 and top folders 121, 122. Folders 121 are mounted on front chain 118 as viewed in Figure 13. Complementary folders 122 are mounted on rear chain 118, as viewed in Figures 1 and 2. In the illustrated embodiment of the invention, four sets of folders 121, 122 are provided. The forward retainer bar chain 135 and the first folder chain 118 are driven through the chain phase adjuster illustrated in Figure 2A so as to provide means for adjusting the phases of the chains 135 and 118 with respect to the remaining chains in the machine and especially with respect to chain 14, which operates the infeed pusher bars 15, and chain 32, which operates the rear pusher bar 30. The phase adjustment of the chains 111 and 113 is so proportioned that while chain 113 is shifted by an amount "a" indicated in Figure 2A, chain 111 is shifted by an amount "b" with $a=2b$. This may be obtained insofar as the phase shifter of Figure 2A is concerned, by connecting the two phase shifters in series as will be explained more fully in connection with Figures 2B and 2C. This relationship is applicable when the diameters of the respective sprocket wheels are equal. The above relationship follows from the functions performed by the forward retainer bar 31 and the first folders 121, 122: whenever the width 136 (see Figure 1) of the article is increased by an amount "a," the forward retainer bar 31 must be advanced by the same amount "a" so as to be properly synchronized with the movement of the article. The first folders 121, 122, however, need be advanced only by a distance $a/2$ because its proper position coincides with the center line of the article and, therefore, distance "a" would be divided by two to give the distance corresponding to the distance by which the first folders 121—122 need be advanced. Therefore, $a=2b$.

*Mechanical phase shifter*

Proceeding now with a more detailed description of the phase shifter illustrated more in detail in Figures 2B and 2C, axle 90 is stationary and all sprocket wheels mounted on this axle revolve around it in the directions illustrated by the arrows. Axle 90 is supported by the main frame of the machine which is illustrated diagrammatically by supports 94 and 94'. Two rocker arms are rotatively mounted, or pivoted, on axle 90; one arm 92 has an extension lever arm 93 provided with a latch 96. Shifting of the position of the lever arm 93 in either of two directions illustrated by a double arrow 100 in Figures 2B and 2C rotates rocker arms 92 around axle 90. Such rotation of the rocker arms 92 rotates sprocket wheels 403 and 421 around a shaft 405 because the sprocket wheels 403 and 421 are rotatively mounted on shaft 405. Shaft 405 is fastened in a non-rotative manner to the two rocker arms 92. Therefore, when the angular positions of the rocker arms 92 is changed through the operation, or tilting, or rotation, of the arms 92 around the stationary shaft 90, the sprocket wheels 403, 421 must rotate around shaft 405 if we are to assume that the sprocket wheels 89 and 401 are stationary and cannot be rotated so as to transmit the resulting phase shift, or the angular displacement of the sprocket wheels 403 and 401 back into the variable speed drive sprocket 9. This is actually the case, and, therefore, any angular displacement of the arm 93 rotates sprocket wheels 403 and 421 as a direct function of the rotation of arms 92. It should be also noted here that the rocker or lever arms 92 are not fastened at their bases to the sprocket wheels 89 and 427, respectively. Therefore, the sprocket wheel 89, and its companion wheel 401 rigidly connected to wheel 89 through a collar not numbered in the drawing, may be considered for the purpose of this explanation of the functioning of the phase shifter, as being held stationary by chain 91 and sprocket 9. Therefore, when arms 92 are revolved around shaft 90, chain 402 which engages successive portions of wheel 401, is held stationary which rotates wheel 403 on shaft 405 and also produces a similar rotation, but in the opposite direction, of sprocket wheels 404 and 407 on an intermediate shaft 406 which is rigidly connected to the arms 92. This rotation of the wheels 404 and 407 is transmitted through a chain 408 to the sprocket wheels 409—410; the sprocket wheels 412, 413, 415, 419 and chains 411 and 111, in turn transmit this rotational motion to a sprocket wheel 116, 117, 123, etc. (see Figures 1, 1A, 2 and 2A) used for advancing the folders 121, 122 which will be described more in detail later.

When the top folders 121—122 are advanced or retarded by a distance "b," then the forward retainer bar 31 and its chain 135 must be advanced by a distance a, equal to a distance $2b$ indicated in Figure 2A. When the rocker arm 92 is in fixed position, all sprocket wheels are in fixed phase relationship with respect to each other and the chains 113 and 111 are also in fixed phase relationship with respect to each other. When lever arm 93 is moved in either direction, it revolves arm 92 around axle 90. If arm 92 is revolved clockwise, wheels 403 and 421 are revolved counterclockwise, which also revolves wheels 413—415—418 and 430—432 counterclockwise. Rotation of the sprocket wheels 418 and 432 in the counterclockwise direction will change the phase position of the chains 111 and 113, respectively, with respect to chain 91. Therefore, the disclosed mechanism permits advancing or retarding the positions of the chains 111 and 113 with respect to chain 91.

In order to obtain twice as large phase shift "a" for the pusher bar chain 135 as compared to the phase shift b obtained for the folders, two identical serially-connected phase shifters are used and the phase shift obtained with the first phase shifter is added to the phase shift obtained with the second phase shifter. In order to obtain such phase relationship the diameters of the respective sprocket wheels in the two phase shifters should be equal to each other. The second phase shifter is identical in its construction to the first phase shifter except that the phase shift obtained with the first phase shifter (wheels 89—401 — 403 — 404 — 407—409—410—412—413—418—110) is added to the second phase shifter through a sprocket wheel 415, chain 416 and sprocket wheels 417 and 419. Sprocket wheel 419, therefore, performs a dual function. It, in combination with the wheels 421 and 422 and chain 420, introduces the phase shift "$b$" and it also adds an additional phase shift $b$ from the first phase shifter to the second shifter by means of chain 416 and its two sprocket wheels 415 and 417. Therefore, the total phase shift obtained at wheel 114 is equal to $2b=a$.

It should be noted here that shafts 426 and 414 are stationary and the sprocket wheels on these shafts are rotatively mounted on these shafts.

*Bottom folder bar 140*

Figure 19:
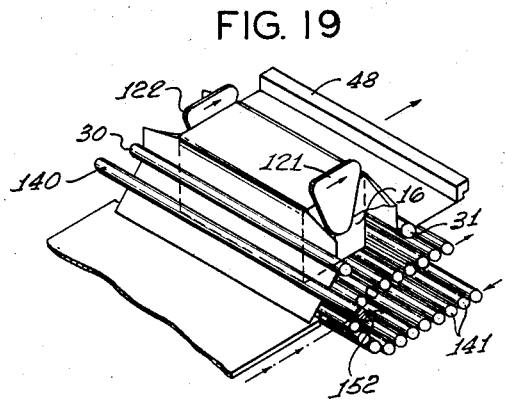
Figure 20:
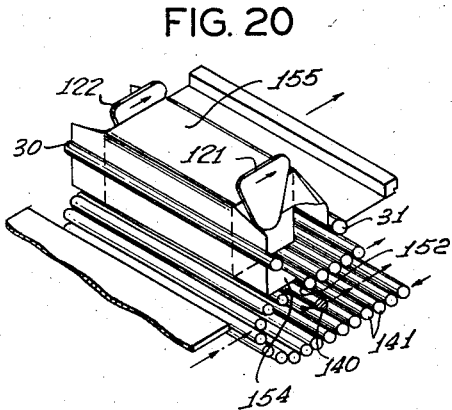
Figure 21:
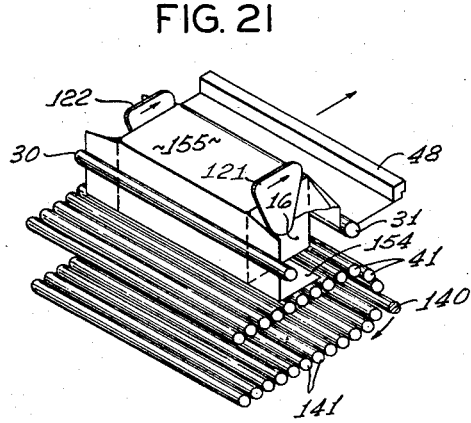

Proceeding now with the description of the chains 138 and 139, Figures 1, 2, 9–12, chain 138 is the bottom folder bar chain because it carries the bottom folder bar 140, and chain 139 is a bottom support bar chain because it supports a plurality of the bottom support bars or rollers, 141. The bottom support bars 141, the bottom folder bar 140, the forward retainer bar 31, the rear pusher bar 30 are also illustated in Figures 17 through 23; Figures 17 through 23 illustrate the progressive steps which take place in the machine after the article reaches the bars 30 and 31 and travels with these bars until it reaches pushers 180, 181 and fourth folder 143 illustrated in Figures 24 through 26. The bottom folder bar chain 138 is driven with the aid of sprocket wheels 144 through 151 (see Figure 9) and it, and an identical arrangement on the other side, carry a single bottom folder bar 140 which is best seen in Figure 9 and also in Figures 19, 20, and 21. Bar 140 and the two chains, such as chain 138, which transport this bar, travel at twice the speed of the chains 14, 47, 135 and 32 which move at the same linear velocity. The spacings between the bars and clamps on the chains 14, 47, 135, 32 and 118 are also equal. Chains 14, 47, 135, 32 and 118 move at the same speed. Chains 138 and 139 also move at the same speed, chain 139 being driven by means of sprocket wheels and a chain (not illustrated) driving chain 138. However, the speed of the chains 138 and 139 is twice as high as the speed of the chains 14, 47, etc., for the reason pointed out below. The length of chain 138 is twice the length of chain 139, this length ratio being assigned to the chains 138 and 139 so as to obtain proper engagement of the bottom folder bar 140 with a gap 152, Figure 19 provided for this purpose between the bottom support bars 141. Figures 19, 20, and 21 illustrate three different sequential positions of gap 152 and of the folder bar 140 and the manner in which bar 140 forms a forward fold 154 of a bottom lap 154—175 in a piece of web 155 which has been previously cut off from the web roll in the manner which will be described later on. Since the article 16 travels at speed $V_1$ at this time, which is equal to the speed of travel of the forward retainer bar 31 and rear pusher bar 30, the bottom folder bar 140 must travel at a higher speed than $V_1$ in order to overtake article 16 and make the forward fold 154. Therefore, its speed of travel $V_2$ is made equal to $2V_1$. Chain 138 is twice as long as chain 139. With this length relationships bar 140 engages or slips into gap 152 once for every two revolutions of the gap, chain 138 being provided with one folder bar which can be arranged in two different ways. In either case, the bottom support bars are cylindrical, or round rods, having a diameter "D" which are transported by the two end chains. In Figures 9, 10, 11 and 12, which disclose the first version, the bars are allowed to rotate in the chain links to which they are connected at both ends by means of round bar pins 153 visible in Figure 9. Accordingly, in this version, the bars are permitted to rotate in the opposite direction to the direction of their travel when they engage the bottom portion of the article. In this manner the surface of the bars, touching the article, is substantially stationary with respect to the article, except for the slippage due to friction.

The second arrangement is that illustrated in Figures 9A, 9B and 9C. In this case the bottom support bars 141 may have an outside diameter "D" as in Figure 9, but they are provided with end rollers 157 and 158 which have a diameter 2D, or twice the diameter of the bars 141. Rollers 157 and 158 frictionally engage two end rails 159 only one rail being visible in Figures 9A–9C. Rollers 157 and 158 rotate the bottom support bars 141 at a peripheral speed which is equal to one half of the linear speed of chain 139. Therefore, the top surface of the bars 141 is substantially stationary with respect to the bottom portion of the article which rests on these bars while it travels at velocity $V_1$ from left to right as viewed in Figures 1, 2 and 9.

*Brush element 165 and plate 167 making the second bottom fold*

Figure 22:
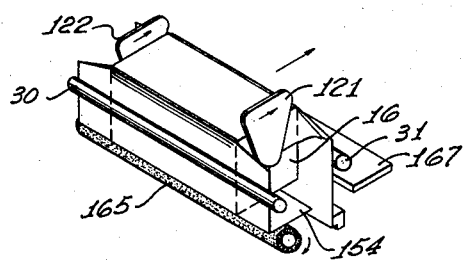

Referring to Figures 9 and 12, mounted on a revolving shaft 160 is a driving gear 161 which drives gears 162 and 163, and gear 163 in turn rotates a shaft 164. Mounted on shaft 164 is a brush element 165 which is mounted in a gap between a reciprocating gap-closing plate 167 and the bottom support bars 141 as these bars rotate around shaft 160. This brush element performs two functions: it keeps the bottom fold 154 in proper position when the article passes over the gap and it also permits the passage of the paper clamp 48' through the gap by allowing the bristles of the brush to bend over and thus allow the free passage of the web clamp 48' through the gap. After clamp 48' passes through the gap, its loading arm, or release arm, 166, Figures 9, 6 and 4, having a roller 167', whose position can be made adjustable, Figure 9, engages stationary cam 168, which produces the rotation of a cam 169. Cam 169 engages a shoulder, or a notch, in a pin 170, Figure 6, and moves pin 170 and a clamping head 171 away from a clamp bracket 772 which is provided with a transverse slot 173 which normally is engaged by the cylindrical portion of the clamping head 171. This withdrawal of head 171 from slot 173 releases the web from the clamp with the result that the released end of the web now hangs loosely in the manner indicated at 174 in Figure 9. The position of the article, web 155 and web clamp 48 just prior to the release of the web by the clamp is illustrated in Figure 22. The next step that takes place in the wrapping process of the article is making the second bottom fold 175 which overlaps the first bottom fold 154 in the manner indicated in Figure 23. This step is performed by allowing the article to travel over the reciprocating plate 167. In the disclosed arrangement, plate 167 is moved in the direction opposite to the direction of motion of the article for closing the gap just prior to the step, as will be described later in connection with Figures 9D, 9E and 9F.

The mechanism for moving plate 167 is illustrated in Figures 9D through 9G and will be described in connection with these figures. Figure 9D illustrates two extreme positions of plate 167. In Figure 9A the plate, illustrated in solid lines, corresponds to a closed gap, and the dotted lines illustrate the position of the plate when the gap is open. In Figures 9D and 9G a two-piece, composite cam 900 and 901 is illustrated which is driven by means of two sprocket wheels 902 and 903 connected to the respective cams. The cams and the sprocket wheels are rotated around an axle 904 which is mounted in and is supported by the main frame of the wrapping machine. Sprocket wheel 902 is rotated by or from chain 47 while sprocket wheel 903 is rotated by or from chain 135. Chain 47 is used to advance, or move, the web clamp 48, while chain 135 is used to move the forward retainer bar 31. Chain 135 and its retainer bar 31 can be moved or advanced with respect to the rear pusher bar 30 whenever the width of the article to be wrapped is changed. Therefore, the phase, or the timing of cam 901 is synchronized with the operation of the entire machine and, specifically, with the operation of the retainer bar 31. This synchronization is adjusted so that plate 167 begins to close the gap immediately after the passage of the web clamp 48 and just clears the retainer bar 31 after bar 31 passes through the gap. This synchronization is illustrated diagrammatically in Figure 9G.

Figure 23:
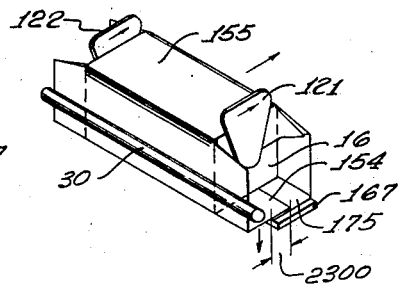

The actual movement of plate 167 is accomplished by connecting the left and right inner corners of plate 167 to two links, such as link 905 in Figure 9D. Links 905 are connected to a cam arm 906 which has a cam roller 907 and a spring 908 which pulls on the arm so that roller 907 constantly follows the cams. Roller 907 is made sufficiently wide so as to engage the cams 900 and 901. Figure 9G illustrates, in dotted lines, the extreme positions of the cams and what happens to plate 167 when cam roller 907 engages different portions of the cams. It should be noted here that for wide articles open dwell on the cam is shorter and closed dwell is longer. The beginning and ending of the opening cycle remains fixed and, therefore, plate 167 begins its opening cycle at the same time irrespective of the width of the article but the beginning and termination of the closing cycle is advanced for wider articles. This advancing and retarding of the closing portion of the cycle is obtained automatically when chains 135, 130 and 112 are either advanced or retarded by changing the setting of the control lever 94 in the manner described previously in connection with the description of Figure 2A. Figure 2D illustrates the guide rails 910 and 911 and rollers 912–915 which are used for guiding plate 167. Four guide rails are used, two rails on each side of belt 62. Figures 22 and 23 illustrate what has been described above in connection with plate 167 and how plate 167 makes the rearward fold 175. After making the rearward fold, plate 167 moves with the rear edge of the article so that the entire bottom lap rests on plate 167 at this instant.

Pusher arms 180 and 181

Figure 24:
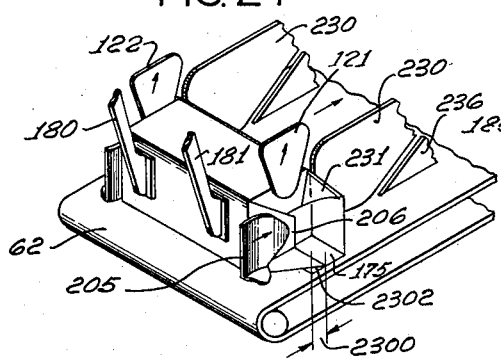
Figure 25:
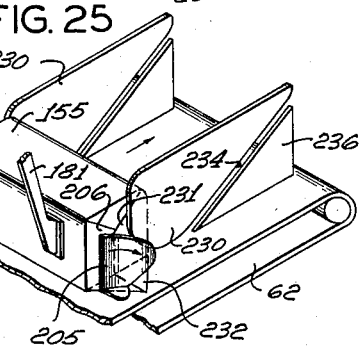
Figure 26:
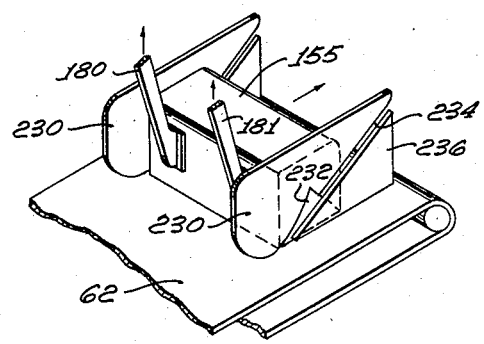

After the article passes over plate 167 in the manner illustrated in Figure 23, the rear pusher bar 30 passes through the gap formed when plate 167 is withdrawn in the manner indicated in Figure 9D in dotted lines, and the article is transferred onto the endless belt 62 and two pusher arms 180 and 181 engage the rear portion of article 16 in the manner illustrated in Figures 24, 25 and 26. The pusher arms, therefore, insure that article 16 travels at uniform speed after it leaves the bottom support bars, or rollers, 141 and is transferred to belt 62. The pusher arms 180 and 181 travel at the same speed as belt 62 and are connected to two chains, such as chain 182 which is driven by means of a chain 183 which in turn is driven by chain 32 through sprocket wheels 41, 184, 185 and 186. Chain 182 revolves around a sprocket wheel 187 and 188. The pusher arms 180 and 181 are connected to their respective chains by means of pivots, or pins, 189 and lever arms 190 as illustrated in Figure 16A. The lever arm is connected at one end to the end of the pusher arm 181 by means of a pin 191, and at the other end to chain 182 in the manner indicated in Figure 16A. Such mounting of the pusher arms permits their rapid advancement when they swing around the sprocket wheel 187 and positive alignment after chain 182 assumes a horizontal position illustrated in Figure 13. It should be noted that when chain 182 travels between the sprocket wheel 187 and sprocket wheel 186, it is supported by and slides over a side-rail 193, Figure 16. Thus, the lower ends of the arms, having rectangular flat surfaces, have these surfaces properly aligned with the matching surface of the article. This type of mounting of the arms also permits the lower rectangular pads to push the article from belt 62 to belt 69 in the manner indicated in Figure 2.

Top folders 121, 122

Proceeding now with the description of top folders 121 and 122 illustrated in Figures 17 through 24 and also Figures 2, 13, 14, 16 and 9, these folders are moved by chain 118 on one side, Figures 1, 2, 1A, 2A, and 13, and an identical chain on the other side. As illustrated in Figures 1 and 2, chain 118 revolves around the sprocket wheels 123, 124, 125 and 126. When chain 118 travels between sprocket wheels 125 and 126, it is supported by and slides over a side-rail 197. As illustrated more clearly in Figure 16, the upper end of the top folder 121 is fastened to chain 118 by means of a plate 198 and pin 199 and plate 198 is also provided with a rotatable cam or rail follower 200 which is connected to plate 198 by means of a pin 201. The rail follower 200 engages a rail 202 which parallels the path of chain 118 in the manner illustrated in Figures 13, 3 and 16. This mode of actuation of the top folder by means of a chain and a cam follower provides a proper path to this top folder so that it engages the web along the path illustrated in Figures 17 through 23 and leaves the web in the manner illustrated in Figure 24. The cam first advances the top folder from the left upper corner 204 of the web across the top of the article and at the same time lowers the folder to the position illustrated in Figure 18. This folds the web and forms a precise upper fold without injuring the web or the article. As illustrated in Figure 24, the top folder also dwells for a sufficiently long time in its upper position so as to hold the upper fold in place while the second folder 205 engages the web and makes the second fold 206. This is also illustrated in Figure 14 which shows the plan view of the second folder 205 and the mechanism actuating this folder.

The second folder 205 (side folder)

The second folder 205 and its operating mechanism are illustrated in Figures 13, 14, 15, 16 and 2. Referring to the above figures, chain 32 drives a sprocket wheel 208 mounted on a shaft 209. Mounted on shaft 209 is a gear 210 which drives gears 211 and 212. Gear 212 has a dwell position illustrated in Figure 15 and a tooth or travel portion. Gear 212 engages gear 214 which also has a dwell portion and a travel or tooth portion. Gear 214 is mounted on a shaft 216 and imparts an intermittent rotation to shaft 216. Also mounted on shaft 216 is a bevel gear 217, which meshes with bevel gear 218 keyed to a shaft 219 which rotates in a hub 220 supported by the frame of the machine. Attached to shaft 219 is an arm 222 which is intermittently rotated through the gear train described above. The outer end of arm 222 is connected through a pin 223 to a second arm 224 the outer end of which includes the second folder 205. The inner end of the second arm 224 is connected through a pin 225, Figure 14, to a cam follower or a roller 226 which follows a groove 227 in a cam member 228. The path of travel followed by the second folder 205 is illustrated in dotted lines in Figure 14. The second folder 205 must travel faster than article 16 in order to make the second fold 206. After article 16 and the second folder 205 advance to the position illustrated in Figure 14A, the third folder plate 230 makes the third fold 231 in the manner illustrated in Figures 14A, 24 and 25 and at this time the second folder 205 must remain stationary, or dwell, and allow article 16 to travel toward the third folder 230 so that the relative positions of the elements corresponds to that illustrated in Figure 25. The article then advances to the position in which the second and the third folds are held in place only by the third folder 230 and the second folder 205 then is ready to travel around the cam member 228. The only remaining fold that is to be completed is the fourth fold 232, Figures 25 and 26, and this fold is made by advancing the article with the aid of belt 62 and pusher arms 180 and 181 between the third and fourth folder plates which have a gap formed between the slanting adjacent edges of the plates 230 and 236. This method of making the fourth fold 232, by using a rising gap 234, is known in the art and, therefore, needs no additional description. As illustrated in Figure 2, after the fourth fold is completed, the article is transferred to the bottom metal belt 69 and two side belts 78 where the article is sealed by applying heat and then cold in the manner described previously.

*Web feeding, clamping and cutting mechanism*

The next mechanisms that will be described are those feeding, cutting, and clamping the web, adjusting the rate of feeding the web into the machine and adjusting the length of the web cut off from the web roll. All of the above mechanisms are illustrated in Figures 1 and 3 through 8. The web rolls are illustrated in Figure 1 at 240 and 241. They are mounted on the respective web roll spindles 242 and 243 which are supported on a rotatable support 244. Web 26 is fed into the wrapping machine by means of web feed rolls 245 and 246. These rolls are driven from chain 47 through sprocket wheels 247 and 248 interconnected by a chain 249. Sprocket wheel 248 in turn is connected to a sprocket wheel 250 which drives a sprocket wheel 251, shaft 253 and a variable speed pulley 254 through a chain 252. Pulley 254 drives a pulley 255 through a V-belt 256. Pulley 255 is mounted on a shaft 257 which supports the upper driven roller 245. The lower roller 246 is an idler roller mounted on a shaft 258 and is driven by roller 245 through a frictional engagement between the two rollers and the web positioned between the rollers as illustrated in Figure 1. Pulley 254 is mounted on shaft 253 which is supported by an arm 259 pivoted on a pin 260 which in turn is supported by a machine frame 261. The lower, free end of arm 259, as seen in Figure 8, is connected to a web-speed-adjusting arm, or bracket 262 by means of a pin 263, the central portion of this pin forming a sliding engagement with the cam portion 264 of arm 259, this cam being best seen in Figure 3. Accordingly, arm 259 is pivoted around pin 260 and revolves around pin 260 when the position of arm 262 is changed. That end of arm 262 which is opposite to the end forming a rotational engagement with pin 263 terminates in an internally threaded hub 265 which is supported by and forms a threaded engagement with a threaded stem 266 best seen in Figures 3 and 7. Stem 266 is supported by brackets 268, 270 and 271 and collars 272, 273, 274, 275 and 276 to hold in proper position with respect to the frame. The lower end of the stem is provided with a bevel gear 277 which is connected to a bevel 278, Figure 7, connected to a shaft 279 and a manually operated handle 280. The threaded hub 265 is connected to a web length adjusting arm 280 which supports a web length adjusting roll 281, Figure 7 through a hub 282. Examination of Figures 3 and 7 indicates that the position of the web length adjusting roll 281 may be raised or lowered by turning handle 280 which in turn either increases or decreases the web loop 283, Figure 1, and the length of the web cut off by the cutting knife which is described below. Decrease in the length of loop 283 must be synchronized with the corresponding decrease in the speed of the web feed and for this reason the arms 280 and 262 are connected to the same hub 265 which slides up and down on screw 266. When hub 265 is lowered, as viewed in Figure 3, the lever arm 259 is rotated in a counter clockwise direction around pivot 260 and pulley 254 is further removed from pulley 255 with the result that belt 256 decreases the periphery of the variable speed pulley 254 with the concomitant decrease in the speed of feeding web 26 into the machine. This is also accompanied with the corresponding reduction in the length of loop 283. In Figures 3 and 7 the web feed speed adjustment mechanism, which includes roller 281 and variable speed pulley 254, and means for operating the two in the manner described above, is illustrated in its maximum speed position with loop 283 having a maximum length and pulley 254 having a maximum diameter. Pulley 254 is that type of pulley which has a spring on one side of the pulley for advancing one half of the pulley toward its second half for increasing the periphery of the pulley and the speed of the variable periphery when the web must be fed at a higher speed. The web feed speed adjustment including arm 262, cam 264 and arm 259 and pulleys 254 and 255 is, therefore, directly connected to and synchronized with the adjustment of the web length which is obtained by adjusting the position of roller 281. It may be stated, therefore, that the web length adjustment is obtained by varying the speed of web fed into the machine. The length of the web is varied so as to adjust its length to the size of the article being wrapped or its girth or transverse periphery. As described previously, chain 47' is the chain which is equipped, or carries, the web clamp 48 which is shown on an enlarged scale in Figure 6 and has been described previously in this specification.

The web-cutting mechanism is illustrated on an enlarged scale in Figure 4. It is driven by chain 47' which engages a sprocket wheel 290. Wheel 290 drives wheel 291 and wheel 291 drives wheel 292. The wheels 291 and 292 have equal diameters so that a knife 294 and a platen 295 have equal angular velocities and meet each other in the manner indicated in Figure 4. In Figure 4 web 26 is illustrated in the process of being cut off by knife 294 and that part of the web which is on the roll side has been inserted into clamp 48 by an inserting plate 296. At this instant the web clamp arm 166 is in the depressed position, as illustrated in Figure 4, because it engages the web clamp loading cam 297. The inserting plate 296 is mounted on a revolving frame 298 which revolves around a stationary cam 299. Immediately after web 26 is cut off the roll 240, it is inserted into clamp 48 in the manner illustrated in Figure 4. The inserted portion of the web is illustrated by a heavy solid line in Figure 4. The distance between knife 294 and clamp 48 is so adjusted that it is equal to the vertical dimension of the slit within clamp 48. Therefore, none of the web is creased but its straight edge is inserted into the clamp without producing any crease. This is necessary in order to have a straight edge or end on the web at the time it is folded over for producing the forward fold 154 illustrated in Figures 20 through 23. Cam 299 is provided with a recess 300 which permits a cam arm 301 to drop into recess 300. This, in turn, produces the vertical travel of plate 296 with the resultant insertion of plate 296 into the open slot in clamp 48, as shown in Figure 4. The cam follower is provided with tension springs 302 and 303 which the cam follower arm 301 to follow the cam. Immediately after the inserting plate 296 is withdrawn from clamp 48, the clamping head 171 is snapped into the position illustrated in Figure 6 and the web from then on is held in the clamped position until arm 166 engages cam 168, Figure 9 which withdraws the clamping heads 171 from their closed position and releases the web for making the rearward fold 175 with the aid of the reciprocating plate 157.

In order to have a continuous control over the movement of web 26, the web-feeding mechanism is provided with a conventional web slack roll 305 which is supported by a loop of web 26. The slack roll 305 is mounted in guides 306 which permit vertical travel of roll 305. Additional control means over the travel of web 26 is provided by a brake 306 shown in Figure 3. Brake 306 prevents any reverse travel of the web after it is cut off by knife 294. It should be noted here that cutting of web 26 is performed simultaneously with its gripping and pulling by the web clamper 48 which is pulled by chain 47. However, that portion of the web which is between knife 294 and a roller 307 becomes loose at the time knife 294 cuts off a predetermined amount, or length, of the web, and it is at this instant that brake 306 prevents web 26 from traveling in the opposite direction. It also should be noted that the web-clamp inserting plate 296 operates at the instant knife 294 completes the cut and, therefore, brake 306 operates only for a very short instant of time. The cut end of web 26, therefore, cannot travel, or slip, in the direction opposite to the direction of its normal travel because of brake 306 in spite of the pull exerted by the web slack roller 305. The web is made to continue its normal travel immediately after it is cut off because the cut-off end of the web is inserted into the web clamp 48 immediately after the cut is completed and clamp 48 pulls the web from then on in the manner described previously by means of two chains 47.

*Article length adjusting mechanism*

The only additional mechanism which needs description is that which is used for adjusting the lateral positions of all elements in the machine which engage two ends of the article as it travels from end to end of the machine. Articles of different lengths (the length of an article, as used here, means the transverse dimension of the article, or the dimension perpendicular to the direction of its travel) may be used in connection with this machine and, therefore, it becomes necessary to make the above elements adjustable so as to make the transverse dimension, or the distance, between the corresponding elements of the machine properly to engage the two ends of the article. This adjusting mechanism will be called here the article-length adjusting mechanism, or the lateral adjustment mechanism.

The above adjustment must be synchronized from end to end of the machine so that all of the elements of the machine instrumental in completing the wrapping (except the bottom fold) would be moved closer or further apart at the same time. The above adjusting mechanism is illustrated in Figures 28 through 32 and will be described in connection with the above figures.

Figures 28 and 31 illustrate the drive mechanisms for the above lateral adjustment mechanism. The mechanism is manually operated by turning a handle 2800 illustrated in Figures 27 and 29. Figure 29 illustrates the transverse vertical sectional view of that portion of the adjusting mechanism which adjusts the lateral positions of the two infeed side-guides 18 mounted on brackets 21. Brackets 21 are mounted on adjusting screws 2900 and 2804 having left hand and right hand threads, only one thread being illustrated in Figure 29. The adjusting screws 2900 and 2804 are rotatively mounted in a stationary frame 2901 which extends from end to end of the infeed chute 17. The frame includes another side element identical to the side element 2901, the two frame members being rigidly connected to each other by means of cross braces such as cross braces 17 and 22. Accordingly, the frame acts as a rigid support for all adjusting screws, the sprocket wheels, such as a sprocket wheel 2904, and a sprocket chain 2905 and additional sprocket wheels and chains which are used for turning all of the adjusting screws simultaneously so as to obtain simultaneous adjustment of the two infeed side-guides 18, top folder elements, such as elements 120, 121, Figure 2, second folder elements 205, third and fourth folder elements 230 and 236, and four side belts such as belts 78 and 79, Figure 2. Chain 2905 extends to and engages a sprocket wheel 2802 which is mounted on the adjusting screw 2804 which is identical to the adjusting screw 2900. Since the two screws are interconnected by chain 2905, they will be rotated in the same direction and to the same extent when handle 2800 is turned. Therefore, the entire length of the two infeed guides 18 (only one is visible in Figure 28) will be moved either in or out when handle 2800 is turned. Shaft 2804 has an additional sprocket wheel keyed to this shaft. This sprocket wheel is used for driving a chain 2806 and a sprocket wheel 2809 mounted on an adjusting screw 2808 which is identical to the adjusting screw 2900; a portion of this screw is illustrated in Figure 30. A sliding frame 3000 is mounted on two rods 3001 and 3104 which are supported by frame 2901 or an extension of frame 2901 not illustrated in Figures 28 and 31. The sliding frame 3000 forms a threaded engagement with adjusting screws 2808 and 3102 and, therefore, when the screws 2808 and 3102 are rotated by means of the sprocket wheels 2809, 3100 and chains 2806 and 2812, frame 3000 is made to travel either to the left or to the right, as indicated by a double arrow 3004 in Figure 30. This frame is used for supporting the entire top folder mechanism including sets of complementary top folders 121, 122, the sprocket wheels 124, 125, 126 and 123 (and the identical arrangement on the other side) with the result that the transverse, or the lateral, positions of these top folder elements 119 through 122, and the chains that drive them, are made laterally adjustable.

Figures 31 and 32 illustrate the remaining means for providing the lateral adjustments for the sets of top folders 121, 122, the second folders 205, the third and fourth folders 230 and 236, and the four side belts such as belts 78 and 79. Adjusting screw 2808 has an additional sprocket wheel 2810 which is connected to sprocket wheel 3100 by means of a chain 2812. Sprocket wheel 3100 is mounted on the adjusting screw 3102 which is identical to screw 2808 and is used for providing the lateral adjustment of the inner end of frame 3000. Frame 3000 is slideably mounted on the transverse rods 3001 and 3104. The adjusting screw 3102 has an additional sprocket wheel mounted on said screw which is not visible in Figure 31 because it is in direct line of view of the sprocket wheel 3100. This second sprocket wheel is connected by means of a chain 3106 to a sprocket wheel 3108 which is mounted on an adjusting screw 3110. The metallic side belts 78 and 3200 are mounted on rollers 3202, 3204 and rollers 3140 (only one is visible in Figure 31) which are keyed to rotatable shafts 3206 and 3207, and stationary axes 3114. The rotatable shafts 3206 and 3207 are supported by means of brackets 3208 3209 which are connected to the bevel gears 3210, 3211, 3212, and 3213 by means of collars 3214 and 3215 respectively and forked shaft-brackets 3216 and 3217. The brackets 3208 and 3209 are also connected to an adjustable sliding frame 3218 and 3219, frame 3218 being also visible in Figure 31, because the main frame number 3220 has been omitted altogether in Figure 31. The side view in Figure 31 also omits the main side member 3222. The frame members 3218 and 3219 are the two members which are made to slide in and out in the manner indicated by double arrows 3224 and 3226. The frame members 3218 and 3219 support the side belts 78 and 3200 by means of brackets 3209 and 3208 and also by means of axles 3114, 3116 and 3118 which are all fastened to the adjustable side frame member 3218. Similar axle members are also used on the other side of the side belt arrangement for supporting the side belts 3200 and the second polar side belt which is not illustrated in any of the figures. The two adjusting screws 3110 and 3120 are turned in either direction by means of the sprocket chain 3122 which is connected to the sprocket wheels 3108, 3228 and 3126. This adjusts the lateral positions of the frames 3218 and 3219 which, in turn, adjusts the lateral positions of the four side belts, 78, 3200, etc.

It is deemed unnecessary to illustrate and describe the lateral adjustments for the third and fourth folders. Suffice it to say that they are attached to the adjustable frame 3000 by means of rods 3129, 3130, 3131 and 3132. The same type of rods are used for the third and fourth folders located on the opposite sides of the machine.

The adjustment of the second folder 205 is partially illustrated in Figure 16 where the adjustable frame 3000 is provided with an integral arm 3010 which supports shaft 219. Shaft 209 rotates in a hub 320, since shaft 209 is connected to the bevel gear 218. The bevel gear 218 is driven by the bevel gear 217 mounted on shaft 216 rotated by gear 214. Gear 217 is slidably mounted on shaft 216 but is prevented from rotation on shaft 216 because of a key 321 mounted on shaft 216. The cam member 228 and hub 220 are prevented from rotation on shaft 219 by means of a fork member 322 which engages gear 217 by means of two pins, only one pin, pin 323 being visible in Figure 16. The pins slide in a groove 324 provided in the hub portion of gear 217. When frame 3000 is made to travel either to the right or left, as illustrated by an arrow 325, the bevel gears 218 and 217, the cam 228 and the second folder elements 222, 224 and 225 travel with frame 3000 and thus adjust the lateral position of the second folder 205 with respect to the article 16. The above constitutes the mechanism for adjusting the second folder 205 so that it is in proper relationship with respect to the article 16 and for adjusting this folder so that its position corresponds to the position it should occupy when the length of the article is altered. No transverse cross-sectional view of frame 3000, Figures 27 and 28 is illustrated at that portion of frame 3000 which is illustrated in Figure 28 since it is comparable to what is illustrated in Figure 30. Suffice it to say that the sprocket wheels 123, 126, 124, 125, 186, 188 and 187 Figure 2A and Figure 1, are caused to move in and out with frame 3000 along their respective shafts. For example, sprocket wheel 123 is caused to slide along its shaft 332, etc. The driving sprocket wheels, such as 117 and 185, remain on outside ends of the respective shafts and do not move in and out with the movement of frame 3000.

In the light of the above description of the lateral adjustment mechanism it follows that all of the article handling mechanisms which engage the two ends 1700 and 1701 of the article and all the mechanisms which make the top, forward, rearward, third and fourth end folds so as to close or seal the ends 1700 and 1701 of the article, and the four sealing belts are adjusted laterally in synchronism and by the same amount when handle 2800 is manually rotated either in clockwise or counterclockwise direction. This lateral adjustment is independent of the operation of the machine and can be made while the entire wrapping machine is either at a standstill or is in operation.

Before proceeding with the description of the operating cycle of the machine, the following parameters of the machine should be noted.

(1) The speed of the machine is made adjustable by interposing a variable speed drive 4 between motor 2 and the sprocket wheels 7, 8 and 9. Turning of handle 5, which operates the variable speed drive, alters the speed of the entire machine which in turn determines the number of articles wrapped by the machine per unit of time (for example, 120 articles per minute).

(2) The machine can be adjusted to accommodate the articles having different lengths (Figures 28-32).

(3) The machine can be adjusted to make the width 2300 (see Figures 23 and 24) of the bottom lap 2302 either narrower or wider by manually turning handle 280, Figure 7 which either raises or lowers the web-length roll 281, Figure 7 which determines the length of the web fed into the machine by simultaneously adjusting the speed of the web-feeding rolls 245 and 246, by simultaneously adjusting the speed of the web-feeding rolls 245 and 246, roll 245 being driven through the variable speed drive 248, 254, 255, 256, etc. (Figures 8 and 3).

(4) The machine can be adjusted to accommodate the articles of different widths (see dimension 1700 in Figure 17) by operating the mechanical phase shifter illustrated in Figure 2B which advances or retards the phase of the retaining bars 31, Figures 1 and 2, and of the top folders 121—122 with respect to the phase of the pusher bars 30 whose phase remains fixed.

(5) Synchronous operation of the machine is obtained by making the pitch (linear distance between two adjacent members) of the pusher bars 15, retaining bars 31, pusher bars 30, clamps 48′, top folders 121—121, 122—122 equal to each other. Let us designate this distance as A cms. or inches.

(6) If the above pitch is equal to A, then the pitch B between the two adjacent pushers 181 when they are in a horizontal position (see two pushers in Figure 2 which push two articles 16, respectively) is equal to $$B = A \cos \theta \tag{1}$$

where angle $\theta$ is the angle between the horizontal plane and chain 118 when it travels between the sprocket wheels 126 and 123. The above relationship is for the type of operation illustrated in Figure 33 in which the vertical axes 3300 of the article and of the top folder 121 coincide after the top folders fully engage the ends of the article, as illustrated in Figure 32 at "A" and then gradually are lifted and turned in the manner illustrated at "B" through "E." In the above case, if the absolute speeds of the chains 14, 47, 135, 32 and 118 are all equal to $S_1$, then the speed of chain 182, used for propagating the pusher arms 180, 181, and of the belts 62, 78, 79, 69 and 76 are equal to $S_2$, and $$S_2 = S_1 \cos \theta \tag{2}$$

The absolute speed, $S_3$, of the bar chain 141, folder bar 140 and its chains 138 may have the following relationship with respect to $S_1$:

$$S_3 > S_1 \tag{3}$$

or, in one particular case, $$S_3 = 2_{S1} \tag{4}$$

If the web speed between the web-feeding rolls 245 and 246 is equal to $S_4$, then $$S_4 \leqq S_1 \tag{5}$$

For the largest length of the individual web pieces fed into the machine for wrapping the articles having the maximum girth and maximum overlap 2300, $$S_4 = S_1 \tag{6}$$

For the minimum length of the individual web pieces $$S_4 < S_1 \tag{7}$$

When the phase relationship between the center line 3300 of article 16 and the center line 3400 of the top folder 121 is as illustrated in Figure 32, then $$S_2 = S_1 \tag{8}$$

In this case the top folder is allowed to recede from the position indicated at A in Figure 33 to the position indicated at E, Figure 33. Such recession takes place because $S_2$ has a vertical and a horizontal components which combine to produce $S_2$; if $S_2$ is equal to $S_1$, it follows that the horizontal component will be smaller than $S_1$ which has only a horizontal component at this time.

As long as the recession of the top folder is not too large so as to cut or tear the forward fold, the functioning of the top folder is satisfactory even if it recedes in the manner indicated in Figure 33.

The operation of the high speed wrapping machine should be apparent in the light of the description given above and, therefore, only a brief summary will be given here.

The article to be wrapped is shifted to an infeed chute 17 after it leaves chute 21. As stated previously, the velocity of the pusher bars 15 is adjustable by means of a valuable speed drive 4 and the manually operated handle 5. Let us suppose for the purpose of this description that the velocity of chain 14 and pusher bars 15 is equal to $V_1$ when the pusher bar 15 pushes article 16 along the upper straight portion of the infeed chute 17. This velocity $V_1$ is illustrated in Figure 1. It will have a horizontal velocity component $V_2$ and an upwardly acting vertical velocity component $V_3$. The angle formed by the vectors $V_1$ and $V_2$ is equal to angle $\theta$ which is equal to the angle formed by velocity vector $V_1$ and chute 17 with a horizontal plane. The paper clamp 48' is traveling at the speed determined by the speed of chains 47 and it is equal to the absolute value of $V_1$, without taking into consideration the direction of $V_1$. Clamp 48' (shown in dotted lines in Figure 3) is traveling in the horizontal direction when web 26 makes contact with the upper leading corner Figure 3, of article 16, when article is about ready to leave chute 17. Accordingly, at this instant the paper is traveling at a somewhat faster horizontal velocity $V_4$ illustrated by the horizontal vector $V_4$ in Figure 3. The absolute value of $V_4$ (without considering its direction) is equal to the absolute value of velocity $V_1$, but it is greater than the horizontal vector component $V_2$ of velocity $V_1$. The angle formed by the chain 47 and the horizontal plane when it travels between the sprockets 51 and 52, which is indicated by angle $\alpha$, is smaller than angle $\theta$ (the absolute values, without considering the signs of the two angles). However, the angles $\psi 1$, $\psi 2$, and $\psi 3$, also indicated in Figure 3 must be equal to each other and also equal to angle $\theta$ insofar as their absolute values are concerned. When this is the case, then the bars 31 and 30 travel at the same absolute velocity as article 16 when they first engage the article and continue to travel at the same horizontal velocity $V_4$ as article 16 as long as they maintain contact with the article. It should be noted here that the above statement is substantially correct although in actual practice synchronization of the chains 15, 135 and 32 is so adjusted that a very short interval is interposed between that instant when the article 16 and the web begin to travel at the horizontal velocity $V_4$ and when the bars 30 and 31 also begin to travel at the same horizontal velocity $V_4$. This enable one wrap of the web around the top and the leading and lagging sides of the article in the manner and sequence illustrated in Figures 3 and 17 through 23. Such mode of operation of the retainer and pusher bars 30 and 31 permits proper "loose" wrapping of the articles mentioned in the objects of the invention and it also completely voids multilation of the articles by the retainer and pusher bars.

The horizontal velocity $V_4$ of the retaining bar 31 and of the pusher bar 30 has the following relationship with velocity $V_1$ $$V_4 = V_1 \qquad (9)$$

The travel of the object through the remaining portion of the machine has been described already and, therefore, needs no repetition here. It can travel either at a constant speed, or horizontal velocity $V_5$ which is equal to $V_1$, or it can travel at a reduced velocity $V_6$ which is equal to $$V_6 = V_1 \cos \theta \qquad (10)$$

which is the same equation as Equation (2) but expressed in terms of vectorial relationships having magnitude and direction rather than speeds $S_1$ which have only magnitude.

In light of the description of the velocity and speed relationships given above, it follows that the article may move either at a constant speed from end to end of the machine or it can move at a constant speed until the retainer or retaining and the pusher bars 30 and 31 leave the article for advancement of the article from then on is performed by the pusher arms of 142 in conjunction with the belt 62 and then by means of the belt 69 and 76. If the initial speed is $S_1$ then the second speed is $S_2$ which is smaller than $S_1$ by the amount of the cosine of angle $\theta$.

It is proper to mention here before concluding the description of the operation of the machine that the angle formed by chute 17 with the horizontal plane the angle formed by the chains 135, 32 and 118 with the horizontal plane when the above mentioned chains travel between the sprocket wheels 320—321, 34—35, 124—125 must be equal so as to obtain proper engagement between the web pieces used for wrapping the article and the elements operated by the above chains.

From the above description of the machine, it should be apparent to those skilled in the art that the machine is entirely capable of accomplishing the objects outlined in the introductory part of the specification with the concomitant advantages of the disclosed machine over the prior art.

What is claimed as new is:

1. A continuous, linear motion article wrapping machine comprising a continuous infeed chute having means for feeding the articles into said machine at a predetermined rate, a continuous web-feeding, cutting and gripping means superimposing a predetermined length of web over said article while said gripping means and said article travel at first and second equal speeds, respectively; top folders and means for moving said top folders into engagement with two respective sides of said article and said web for making two top folds in said web, a bottom folder bar and means for moving said bar at a greater speed than the speed of said article and said web for making a forward bottom fold, a reciprocating plate for making a rearward bottom fold, two second folder means and means for operating said second folder means at a speed greater than the speed of said article and said web for making two second folds, and stationary third and fourth folder means for completing the folding of said article.

2. A high speed article wrapping machine comprising an infeed chute having means for feeding the articles at a constant speed $S_1$; a web-feeding means superimposing a predetermined length of web over said article, said web-feeding means making said length of web to travel at said constant speed $S_1$; top folder means traveling at said speed $S_1$, and a forward bottom folder means travelling at a speed $S_2$ which is greater than $S_1$.

3. The high speed article wrapping machine as defined in claim 2 which also includes a reciprocative rearward bottom folder means making a rearward bottom fold overlapping said forward bottom fold by traveling in the direction opposite to the direction of travel of said article.

4. The high speed article wrapping machine as defined in claim 2 which also includes second folder means for making two second folds on two opposed sides of said article, said second folder means traveling at a variable speed while making said second folds, said variable speed being greater than $S_1$ at the time of making the second folds and being less than $S_1$ at the time of completing the second folds.

5. The high speed article wrapping machine as defined in claim 4 which also includes stationary third and fourth folder means, and pusher means for pushing said article at a speed $S_3$ which is less than $S_1$.

6. The high speed article wrapping machine as defined in claim 5 in which said pusher means includes chain and linkage means for moving said pusher means at said speed $S_3$ when said pusher means is in contact with said article, said linkage means moving said pusher means variable speeds when said pusher means approaches and leaves said article.

7. A high speed article wrapping machine including an infeed mechanism receiving and feeding the articles at a speed $S_1$, a web feeding means superimposing a piece of web over said article, while transporting said piece at said speed $S_1$, a retainer bar and a pusher bar wrapping said piece of web over the top of said article and two sides of said article adjacent to said bars, said bars having means for moving said bars at said speed $S_1$; top, forward bottom, rearward bottom, side, third and fourth folder means for completing the wrapping of said article while said article is moving continuously first at a speed $S_1$ and then at a speed $S_3$, said speed $S_3$ being slightly smaller than $S_1$; three endless, metallic, heated belts for heating the end folds and the bottom lap; and three endless, metallic, refrigerated belts for cooling said end folds and bottom lap, thereby sealing said article within said piece of web.

8. The high speed article wrapping machine as defined in claim 7 in which said web feeding means includes a web roll, web feed rollers, web cutoff knife mounted on a first rotatable cylinder said first cylinder having an axis forming a sharp angle with the direction of travel of said web, said knife having the shape of a helix, a second cylinder lying in the same plane as said first cylinder, said plane being perpendicular to the plane of travel of said web at the point of travel of said web between said cylinders, and a platen mounted on said second cylinder, said platen having the shape of a helix engaging said knife at a meeting point between said knife and said platen, whereby said web is cut-off progressively along a line perpendicular to the edge of said web, and means for rotating said cylinders at two equal angular velocities.

9. The high speed article wrapping machine as defined in claim 8 which also includes a web clamp traveling at said $S_1$; and means operated by said second cylinder for clamping the cut-off end of said web in said clamp immediately upon completion of said cut-off.

10. A high speed article wrapping machine comprising an infeed chute having spaced, chain-driven pusher bars driven at a constant speed $S_1$, a web-feeding and cutting mechanism feeding cut-off pieces of web at a constant speed $S_1$, a plurality of spaced, chain-driven retainer bars driven at a constant speed $S_1$, a plurality of spaced, chain-driven pusher bars driven at a constant speed $S_1$, a bottom folder bar chain-driven at a constant speed $S_2$ which is greater than $S_1$, and endless bar-chain having a plurality of chain-driven transverse bars having at least one gap for accommodating said bottom folder bar, said endless bar chain being driven at said constant speed $S_2$, a plurality of top folders mounted on two endless chains driven at a constant speed $S_1$, a plurality of pusher arms mounted on two endless chains moving at a constant speed $S_3$ smaller than $S_1$; two second folder arms, and means for rotating said second folder arms in synchronism at two equal, variable angular speeds having peripheral speed components greater than $S_1$ when said arms are making second folds and peripheral speed components equal to zero upon completion of said second folds.

11. The high speed article wrapping machine as defined in claim 10 in which said web feeding and cutting mechanism includes two endless chains, a plurality of web-clamping means driven by said chains at a constant speed $S_1$; a rotatable, web-cutting knife and a rotatable platen engaging said web and said knife, and a web clamp inserting plate, said plate being rotatable at the same angular speed as said knife and said platen for inserting the leading edge of the incut portion of said web into said web-clamping means.

12. The high speed article wrapping machine as defined in claim 10 in which said web-feeding and cutting mechanism includes an adjustable speed drive for feeding said web, a web-length adjusting means, and additional means for simultaneously increasing the speed of said web-feeding mechanism and increasing the web-length by altering the setting of said web-length adjusting means, said additional means also being capable of decreasing said speed and said web-length.

13. The high speed article wrapping machine as defined in claim 12 in which said adjustable speed drive is normally adjusted to feed said web at a speed $S_4$, said speed $S_4$ having the following range of relationships with respect to $S_1$: $S_4 \leqq S_1$.

14. The high speed article wrapping machine as defined in claim 10 which also includes guide sprocket wheels for guiding the chains driving said retainer and pusher bars, said bars pushing said article from the inner end of said infeed chute to the inner, or down stream end, of said transverse bars.

15. The high speed article wrapping machine as defined in claim 10 which also includes a prime mover for operating said machine, said prime mover having a first drive shaft and a first sprocket wheel mounted on said first shaft, a second shaft having at least second and third interconnected sprocket wheels and sixth and seventh interconnected sprocket wheels rotatively mounted on said second shaft, a chain connecting said first wheel to said second wheel, a rocker arm rotatively mounted on said second shaft, fourth and fifth interconnected sprocket wheels mounted on a third shaft at the outer end of said arm, a sprocket chain driving said fourth sprocket wheel through said third sprocket wheel, a chain driving said sixth sprocket wheel from said fifth sprocket wheel, an eighth sprocket wheel mounted on a fourth shaft driving the chains of said retainer bar, a chain driving said eighth sprocket wheel from said seventh wheel, and a lever arm for rotating and changing the angular position of said rocker arm with respect to said second shaft for changing the phase relationship between said first and fourth shafts.

16. The high speed article wrapping machine as defined in claim 10 which also includes a prime mover for driving said machine, said prime mover including a shaft, a toothed wheel mounted on said shaft, a positive drive means connected to said wheel for driving said machine, and a mechanical phase shifter driven by said drive means, said phase shifter being connected to and driving the chains of said retainer bars and the chains of said top folders, said phase shifter having means for advancing the positions of said retainer bars and top folders for adjusting their relative positions to that required by the width of an article being wrapped by the machine.

17. A mechanical phase shifter comprising positive driving means, a first positively driven means having a first axis of rotation and being driven by said driving means, a second positively driven means connected to and driven by said first means, said second means having a second axis of rotation radially displaced from the first axis, a third positively driven means rotatively mounted on said first axis and driven by said second means, an external load driven from said third means, and a lever arm for rotating said second axis around said first axis.

18. A high speed article wrapping machine comprising an infeed chute having a plurality of chute bars, for advancing said article from the outer end to the inner end of said chute, web-clampers for superimposing cut-off pieces of web on top of said articles, a plurality of retainer bars, pusher bars, and top folders, means for positively driving all of said chute bars, web-clampers, retainer bars pusher bars and top folders at equal speeds, a bottom folder bar, means for positively driving said bottom folder bar at greater speed than said equal speeds, pusher arms, and an endless belt for advancing said article beyond the travel of said bottom folder bar at a speed which is slightly lower than said equal speeds.

19. A high speed, continuous travel article wrapping machine including means for making a forward bottom fold, said means comprising a plurality of positively driven bottom support bars, a bottom folder bar, a pusher bar and a retainer bar for advancing said article, said bottom support bars having at least one gap, first and second means for advancing said bottom support bars and a bottom folder bar, respectively, at a speed $S_2$, and third and fourth means for advancing said pusher and retainer bars, respectively, at a speed $S_1$, said bottom folder bar periodically fitting into said gap while said bottom support bars and said bottom folder bar travel at said speed $S_2$, said bottom folder bar making said forward bottom fold upon fitting into said gap.

20. The high speed wrapping machine as defined in claim 19 in which said first through fourth means comprise first through fourth pairs of sprocket chains, respectively, and a plurality of sprocket wheels for driving said chains at constant speeds, said second pair of sprocket chains being twice as long as said first pair of chains, and said speed $S_2$ being twice as large as said speed $S_1$.

21. The high speed wrapping machine as defined in claim 20 in which said bottom support bars have a diameter $D_1$, each bar having a roller at one of its ends having a diameter $2D_1$, and rail means for engaging said rollers, whereby the surface of said bottom support bars moves at a velocity $S_1$ equal to the velocity $S_1$ of said article.

22. The high speed wrapping machine as defined in claim 19 which also includes means for making the surface of said bottom support bars stationary with respect to said article, and additional means for making $S_2 = 2S_1$.

23. The high speed wrapping machine as defined in chaim 19 which also includes fifth means for making a rearward bottom fold, said means following said means for making a forward bottom fold, said fifth means comprising a reciprocating plate.

24. The high speed wrapping machine as defined in which said fifth means also includes means for advancing said article at a constant speed $S_3$, said speed $S_3$ having the following relationship with respect to $S_1$: $S_3 \leq S_1$.

25. A web feeding and cutting mechanism for an article wrapping machine said mechanism including a web-cutting knife, a knife platen, means for rotating said knife and platen at two equal but opposite angular velocities around two fixed respective axes, the edge of said knife and the outer surface of said platen having two equal radii, whereby said knife and platen have equal peripheral velocities, said knife engaging said web and said platen for periodically cutting said web; web-feeding rollers, means for driving said rollers, said last means including a variable speed drive for said web-feeding rollers, an adjustable web-length adjusting roll, and means for simultaneously adjusting the position of said web-length adjusting roll and said variable speed drive for decreasing and increasing the length of web pieces cut-off by said knife and fed into said machine.

26. A web-feeding and cutting mechanism as defined in claim 25 which also includes a web clamp, means for advancing said clamp in synchronism with the rotation of said knife and platen, whereby said clamp is a predetermined, fixed distance from said knife and platen when said knife cuts said web, and additional means for inserting the leading edge of the uncut web into said clamp immediately upon cutting of said web by said knife.

27. A mechanism for partially wrapping a web around an article, said mechanism including an infeed chute having a plurality of pusher bars, said infeed chute forming a negative angle X with a horizontal plane, whereby the articles rise to a higher level while traveling along said infeed chute at a speed $S_1$, a web-feeding mechanism furnishing a piece of web of proper length over said article when said article reaches the inner, or top, end of said infeed chute, a retainer bar traveling at a speed $S_1$, said bar traveling along a path forming a positive angle $X_2$ with said horizontal plane at the instant said retainer bar engages the top of said web in front of said article when said article leaves said infeed chute and then traveling in said horizontal plane after said article leaves said chute and also travels in a horizontal plane, a rear pusher bar engaging said web and the rear, or the lagging, portion of said article when said article leaves said infeed chute, and means for advancing said rear pusher bar at said speed $S_1$, said means also progressively lowering said rear pusher bar upon contacting said web until said rear pusher bar engages the lower half of said article.

28. A mechanism for partially wrapping a web over the top, front and rear sides of an article, said mechanism comprising an infeed chute having a rising slope raising said article, a web feeding means superimposing over the top of said article a piece of web when said article travels over the last, or upper, portion of said infeed chute, a retainer bar engaging said web and the upper, front portion of said article at substantially the instant said piece of web is superimposed over said article, and a rear pusher bar engaging said web and the rear, upper side of said article when said article is about to leave said chute.

29. The mechanism as defined in claim 28 in which the slope of said infeed chute forms an angle $-X°$ with a plane Y, and first and second means for moving said retainer bar and rear pusher bar, respectively, in two parallel planes forming an angle $X°$ with said plane Y, the absolute magnitudes of $-X°$ and $X°$ being equal, said two parallel planes terminating at about the upper end of said infeed chute, said first and second means thereafter moving said retainer and pusher bars in said Y plane.

30. The mechanism as defined in claim 29 which includes feeding means within said chute, and drive means for driving said feeding means and said bars at equal speeds.

31. The mechanism as defined in claim 28 which also includes a bottom folder bar engaging the lower portion of the rear, or lagging, side of said article shortly after said article leaves said infeed chute, said bottom folder bar traveling at a faster speed than said article, the path of said folder bar being along the bottom portion of said article for making a bottom forward fold in said web.

32. A high speed article wrapping machine comprising a plurality of means for moving said article first at constant speed $S_1$ and then at constant speed $S_3$ from the point of entry of said article into the machine to the point of exit of said article from said machine, additional means for superimposing a piece of wrapping web over the top and leading and lagging sides of said article while it is moving at said constant speed $S_1$, and a plurality of means for making botttom lap and all side folds while said article is moving first at said constant speed $S_1$ and then at said speed $S_3$.

33. The high speed article wrapping machine as defined in claim 32 in which said speed $S_1$ is equal to an upwardly directed velocity vector $V_1$ having a horizontal component $V_2$ and a vertical component $V_3$ at the entry of said article into said machine, then said speed $S_1$ becoming equal to a velocity vector $V_4$ having the same magnitude as vector $V_1$ but forming an obtuse angle with said vector $V_1$ and having the direction of the vector $V_2$.

34. A high speed article wrapping machine comprising first means for moving said article at a constant velocity $V_1$ having a vertical, upwardly directed velocity vector $V_3$ and a horizontal velocity vector $V_2$, said first means moving said article from the point of entry of said article into said machine to the second point at which a piece of web is superimposed over said article, and second means for moving said article from said second point to an intermediate point in said machine, said second means moving said article at a constant velocity $V_4$ said velocity $V_4$ being equal to $V_1$ and having the same direction as said velocity $V_2$, said velocities $V_1$, $V_2$, $V_3$, and $V_4$ all lying in the same plane.

35. The high speed article wrapping machine as defined in claim 34 which also includes third means for superimposing a piece of wrapping web over the top and leading and lagging sides of said article when said article is leaving said first means, said third means moving said web at a velocity $V_5$ at the instant of establishing a contact between said web and said article, said velocity $V_5$ being composed of a horizontal vector and a downwardly pointing vector, and a plurality of additional means of making bottom wrap and all side folds while said article is moving at said velocity $V_4$.

36. A high speed article wrapping machine comprising first means for moving said article at a constant velocity $V_1$ having a vertical, upwardly directed velocity vector $V_3$ and a horizontal velocity vector $V_2$, said means moving said article from the point of entry of said article into said machine to the second point at which a piece of web is superimposed over said article, second means for moving said article from said second point to a third point at a horizontal velocity $V_4$ having the same direction as said vector $V_2$, and top folder means having two top folders for making two top folds at the respective ends of said article, said top folder means moving the two top folders at the horizontal velocity $V_4$ as long as said top folders are in contact with the two ends of said article through said web.

37. The high speed article wrapping machine as defined in claim 36 which also includes a web feeding means for feeding individual pieces of web for wrapping said article, said web feeding means including additional means for feeding said web pieces at a velocity $V_5$ having a downwardly pointing vertical component $V_6$, and a horizontal component $V_7$ which is greater than the horizontal velocity vector $V_2$, said additional means changing said velocity $V_5$ to a velocity $V_8$ having the same magnitude as velocity $V_5$ but having only a horizontal component substantially at the time when the top of said article touches said web.

38. The high speed article wrapping machine as defined in claim 37 in which said second means includes a plurality of retainer bars and two retainer bar chains for moving said bars, said chains moving said bars at a velocity $V_9$ having a downwardly acting vertical velocity component $V_{10}$, and a horizontal velocity component $V_{11}$ equal to the horizontal velocity vector component $V_2$ at the instant of the initial contact of the retainer bar with the leading portion of said web piece, said chains thereafter moving said retainer bar at said horizontal velocity $V_4$.

39. The high speed article wrapping machine as defined in claim 38 in which said second means also includes a plurality of pusher bars and two pusher bar chains for moving said pusher bars, said pusher bar chains moving said bars at said velocities $V_9$, $V_{10}$ and $V_{11}$ at the instant of the initial contact of the pusher bar with the lagging portion of said web piece, said pusher bar chains thereafter moving said retainer bar at said horizontal velocity $V_4$.

40. The high speed article wrapping machine as defined in claim 39 in which said second means also includes bottom support rollers and a bottom folder bar and means for moving said bottom folder bar and said bottom support rollers at a horizontal velocity $V_{12}$ which has the following relationship with respect to the horizontal velocity $V_4$: $V_4 < V_{12}$.

41. The high speed wrapping machine as defined in claim 40 which also includes a reciprocating plate for making a rearward bottom fold for completing a bottom wrap and means for moving said reciprocating plate at a variable horizontal velocity $V_{13}$ which is smaller than $V_4$ and has an opposite direction or sign than $V_4$ at the time of making said rearward bottom fold.

42. The high speed article wrapping machine as defined in claim 36 which also includes third means for moving said article at a horizontal speed $V_{14}$ through the remaining portion of said wrapping machine, the relationship between said $V_{14}$ and said $V_1$ being as follows:

$$V_{14} \leq V_1 \cos \theta$$

where angle $\theta$ is the angle between $V_1$ and $V_3$.

43. A second folder mechanism for a high speed wrapping machine in which an article to be wrapped travels at a speed pointing continuously in one direction from end to end of the machine, said second folder mechanism comprising a second folder plate, means for rotating said plate along a path approximately an elliptical path, said means also including additional means for rotating said plate intermittently along said path, including a constant speed and a speed which is equal to zero.

44. A second folder mechanism in a high speed wrapping machine for making a second fold in a web used for wrapping an article with the aid of said machine, said mechanism including a second folder plate having an arm terminating at one end with said plate and at the other end with a cam follower, a cam having a path for said cam follower approximating an ellipse, a second arm, means for intermittently rotating said second arm around a fixed axis, said second arm having an outer end, a rotatable pivotal connection between said outer end of said second arm and an intermediate point on said first arm for rotating said first arm with an intermittent angular velocity around said cam with the air of said second arm, said means for rotating said second arm by said means also including additional means for obtaining a dwell period when both of said first and second arms are at a standstill.

45. A continuous, linear motion article wrapping machine comprising an infeed chute having two side-rails acting as lateral guides for said article; means for superimposing a wrapping web over said article; top folders and means for moving said top folders into engagement with two respective sides of said article and said web for making two top folds in said web; two second folder means; two third and fourth folder means; fold sealing means at the exit part of said machine; and last means for manually adjusting the lateral positions of said two side-rails, top folders and said means for moving said top folders, two second folder means, two third and fourth folder means and said fold sealing means; said last means including a plurality of stationary machine frame members extending through the length of said machine and a corresponding plurality of transversely movable frames supported by the respective stationary frame members, a plurality of transverse screw-type adjusting shafts; and positive drive means for said shafts for moving all of said movable frames toward each other or away from each other by manually turning said positive drive means for manually and simultaneously adjusting the lateral positions of all the elements engaging the sides of said article.

46. A continuous, linear motion article wrapping machine comprising a continuous infeed chute having means for feeding the articles into said machine at a predetermined rate, a continuous web-feeding, cutting and gripping means superimposing a predetermined length of web over said article while said gripping means and said article have equal linear velocities, top folders and means for moving said top folders into engagement with two respective sides of said article and said web for making two top folds in said web, a bottom folder bar and means for moving said bar at a greater linear velocity than the linear velocity of said article and said web for making a forward bottom fold, a reciprocating plate for making a rearward bottom fold, two second folder means for making side folds in said web and overlying said top folds, and third and fourth folder means for completing the folding of said article.

47. A high speed article wrapping machine including an infeed mechanism receiving and feeding the articles at a linear velocity $V_1$, a web feeding means superimposing a piece of web over said article, while transporting said piece at said velocity $V_1$, a retainer bar and a pusher bar wrapping said piece of web over the top of said article and two sides of said article adjacent to said bars, said bars having means for moving said bars at velocity $V_1$, top, forward bottom, rearward bottom folder means for wrapping said piece of web about the girth and adjacent the top sides of said article while said article is moving continuously at a linear velocity $V_1$, and third folder means and fourth folder means for completing the wrapping of said article while said article is moving continuously at a linear velocity $V_2$, said velocity $V_2$ being slightly smaller than velocity $V_1$.

No references cited.